United States Patent
Mann et al.

(10) Patent No.: US 6,557,114 B2
(45) Date of Patent: Apr. 29, 2003

(54) LOOSELY COUPLED MASS STORAGE COMPUTER CLUSTER

(75) Inventors: Bruce E. Mann, Mason, NH (US); Philip J. Trasatti, Brookline, NH (US); Michael D. Carlozzi, Canton, MA (US); John A. Ywoskus, Merrimack, NH (US); Edward J. McGrath, Wayland, MA (US)

(73) Assignee: Seachange Technology, Inc., Maynard, MA (US)

( * ) Notice: Subject to any disclaimer, the term of this patent is extended or adjusted under 35 U.S.C. 154(b) by 0 days.

(21) Appl. No.: 09/954,830

(22) Filed: Sep. 18, 2001

(65) Prior Publication Data

US 2002/0013916 A1 Jan. 31, 2002

Related U.S. Application Data

(60) Continuation of application No. 09/412,232, filed on Oct. 5, 1999, which is a continuation of application No. 08/991,278, filed on Dec. 16, 1997, now Pat. No. 5,996,089, which is a division of application No. 08/547,565, filed on Oct. 24, 1995, now Pat. No. 5,862,312.

(51) Int. Cl.[7] ................................................ G06F 11/00
(52) U.S. Cl. .......................................... 714/6; 711/163
(58) Field of Search ........................ 714/6, 2, 4, 11, 714/13, 20, 25, 38, 43, 48; 711/114, 163; 709/201, 203

(56) References Cited

U.S. PATENT DOCUMENTS

| | | |
|---|---|---|
| 4,729,095 A | 3/1988 | Colley et al. |
| 4,868,818 A | 9/1989 | Madan et al. |
| 4,905,145 A | 2/1990 | Sauber |
| 5,008,882 A | 4/1991 | Peterson et al. |
| 5,072,371 A | 12/1991 | Benner et al. |
| 5,088,081 A | 2/1992 | Farr |
| 5,093,826 A | 3/1992 | Leichum |
| 5,113,523 A | 5/1992 | Colley et al. |
| 5,130,992 A | 7/1992 | Frey, Jr. et al. |
| 5,155,835 A | 10/1992 | Belsan |
| 5,155,845 A | 10/1992 | Beal et al. |
| 5,202,980 A | 4/1993 | Morita et al. |
| 5,208,813 A | 5/1993 | Stallmo |
| 5,228,127 A | 7/1993 | Ikeda |
| 5,239,659 A | 8/1993 | Rudeseal et al. |

(List continued on next page.)

FOREIGN PATENT DOCUMENTS

| | | |
|---|---|---|
| EP | 0 232 859 | 8/1987 |
| EP | 0 584 804 A2 | 3/1994 |
| EP | 0 654 736 A2 | 5/1995 |

OTHER PUBLICATIONS

Memorandum by SeaChange Intl Inc., in support of [3–1] motion for Preliminary Injunction (kc) [Entry date Jun. 14, 2000].

(List continued on next page.)

*Primary Examiner*—Nadeem Iqbal
(74) *Attorney, Agent, or Firm*—Fish & Richardson P.C.

(57) ABSTRACT

A method and apparatus redundantly store data, in particular video data objects, in a distributed computer system having at least three processor systems, each processor system being connected in point to point two way channel interconnection with each other processor system. The data is stored in a redundant fashion both at the computer system level as well as the processor system level. Accordingly, the failure of a single processor does not adversely affect the integrity of the data. The computer system can also overlay a switching system connected in a ring fashion for providing a fault tolerance to the failure of a single connected processor system at the switch level. Accordingly, there results a fault tolerant data distribution system.

19 Claims, 19 Drawing Sheets

U.S. PATENT DOCUMENTS

| | | | |
|---|---|---|---|
| 5,251,299 A | | 10/1993 | Masuda et al. |
| 5,265,098 A | | 11/1993 | Matson et al. |
| 5,271,012 A | | 12/1993 | Blaum et al. |
| 5,301,297 A | | 4/1994 | Menon et al. |
| 5,303,244 A | | 4/1994 | Watson et al. |
| 5,333,143 A | | 7/1994 | Blaum et al. |
| 5,351,246 A | | 9/1994 | Blaum et al. |
| 5,357,607 A | | 10/1994 | Sathi et al. |
| 5,367,636 A | | 11/1994 | Colley et al. |
| 5,371,882 A | | 12/1994 | Ludlam |
| 5,375,128 A | | 12/1994 | Menon et al. |
| 5,379,417 A | | 1/1995 | Lui et al. |
| 5,386,516 A | | 1/1995 | Monahan et al. |
| 5,390,187 A | | 2/1995 | Stallmo |
| 5,390,327 A | | 2/1995 | Lubbers et al. |
| 5,392,244 A | | 2/1995 | Jacobson et al. |
| 5,396,485 A | | 3/1995 | Ohno et al. |
| 5,402,428 A | | 3/1995 | Kakuta et al. |
| 5,404,508 A | | 4/1995 | Konrad et al. |
| 5,410,667 A | | 4/1995 | Belsan et al. |
| 5,412,661 A | | 5/1995 | Hao et al. |
| 5,471,615 A | | 11/1995 | Amatsu et al. |
| 5,488,731 A | | 1/1996 | Mendelsohn |
| 5,504,861 A | | 4/1996 | Crockett et al. |
| 5,544,163 A | | 8/1996 | Madonna |
| 5,583,995 A | | 12/1996 | Gardner et al. |
| 5,604,862 A | * | 2/1997 | Midgely et al. ........ 395/182.04 |
| 5,608,448 A | | 3/1997 | Smoral et al. |
| 5,623,595 A | | 4/1997 | Bailey |
| 5,638,516 A | | 6/1997 | Duzett et al. |
| 5,671,371 A | | 9/1997 | Kondo et al. |
| 5,671,377 A | | 9/1997 | Bleidt et al. |
| 5,701,407 A | * | 12/1997 | Matsumoto et al. ... 395/182.05 |
| 5,805,804 A | | 9/1998 | Laursen et al. |
| 5,862,312 A | * | 1/1999 | Mann et al. ........... 395/182.04 |
| 5,920,702 A | | 7/1999 | Bleidt et al. |
| 5,996,089 A | * | 11/1999 | Mann et al. .................... 714/6 |
| 6,108,699 A | * | 8/2000 | Moiin ........................ 709/221 |
| 6,269,453 B1 | * | 7/2001 | Krantz ........................... 714/6 |
| 6,374,336 B1 | * | 4/2002 | Peters et al. ................ 711/167 |
| 6,412,079 B1 | * | 6/2002 | Edmonds et al. ............. 714/11 |

OTHER PUBLICATIONS

Declaration of Steven R. Katz in support of SeaChange Intl, Inc.,'s Motion for Preliminary Injunction (kc) [Entry date Jun. 14, 2000].

Declaration of William C. Styslinger III (kc) [Entry date Jun. 14, 2000].

Declaration of Branko J. Gerovac (kc) [Entry date Jun. 14, 2000].

Declaration of Dr. Ethan L. Miller (kc) [Entry date Jun. 14, 2000].

Answering Brief Filed by nCube Corporation [3–1] motion for Preliminary Injunction (sm) [Entry date Jul. 18, 2000].

Declaration of Robert Duzett in Support of Opposition to Pltf's Motion for Preliminary Injunction. (sm) [Entry date Jul. 18, 2000].

Declaration of A.J. Nichols in Support of Opposition to Pltf's Motion for Preliminary Injuction. (sm) [Entry date Jul. 18, 2000].

Declaration of Dr. John Wilkes in Support of Opposition to Pltf's Motion for Preliminary Injunction (sm) [Entry date Jul. 18, 2000].

Declaration of Dr. Steven Berson In Support of Opposition to Pltf's Motion for Preliminary Injunction. (sm) [Entry date Jul. 18, 2000].

Plaintiff's Opening Claim Construction Brief (sm) [Entry Date Aug. 15, 2000].

Supplemental Declaration of Ethan J. Miller.

NCUBE Corporation's Opening Brief in Support of Proposed Claim Construction (sm) [Entry date Aug. 16, 2000].

Declaration of Dr. John Wilkes in Support of nCUBE Corporation's Opening Brief on Claim Construction (sm) [Entry date Aug. 16, 2000].

Defendant nCUBE's Supplemental Motion on Claim Construction.

Plaintiff's SeaChange's Response to Supplemental Motion on Claim Construction.

Reply by SeaChange Int'l Inc. to [20–2] counter claim (sm) [Entry date Aug. 22, 2000].

"NCube 3 Overview", Jul. 7, 1994, pp. 1–29.

"Ncube3 I/O Functional Specification", Jul. 28, 1994, pp. 1, 3, 5, 7, 9, 11, 13, 15.

"M300 Product Plan", Product Proposal, Oct. 18, 1996, pp. 1–10.

"Design of VMS Volume Shadowing Phase II–Host–based Shadowing", S.H. Davis, Digital Technical Journal, vol. 3, No. 3, Summer 1991, pp. 1–16.

"Operating Systems Review", Proceedings of the Fourteenth ACM Symposium on Operating Systems Principles, vol. 27, No. 5, Dec., 1993.

"Swift/RAID: A Distributed RAID System", D. Long et al., 1994 The USENIX Association, Computing Systems, vol. 7, No. 3, Summer 1994.

Kenneth H. Bates and Marvin TeGrotenhuis, "Shadowing Boosts Reliability," Computer Design, Apr. 1985, pp. 129–137.

Nancy P. Kronenberg, et al., "VAXclusters: A Closely–Coupled Distributed System," ACM Transactions on Computer Systems, vol. 4, No. 2, May 1986, pp. 130–146.

David A. Patterson, et al., "A Case for Redundant Arrays of Inexpensive Disks (RAID)," Report No. UCB/CSD 87/391, Dec. 1987.

David A. Patterson, et al., "A Case for Redundant Arrays of Inexpensive Disks (RAID)," Association of Computing Machinery, 1988, pp. 109–116.

"Parallel Programming: A Primer," ParaSoft Release 1.0. ParaSoft Corporation, 1988.

Winfried Mularski, Multicluster Series Hardware Documentation & Software Documentation, MSC Mass Storage Controller, Busless Transputer Module with SCSI and floppy Interface Technical Documentation, Version 1.3, Parsytec GmbH, May 1989.

Michael Stonebraker, "Distributed RAID—A New Multiple Copy Algorithm," Memorandum No. UCB/ERL M89/56, May 15, 1989.

John Wilkes, "DataMesh—scope and objectives: a commentary," Technical Report No. HPL–DSD–89–44, Jul. 19, 1989.

Michael Stonebraker and Gerhard A. Schloss, "Distributed RAID—A New Multiple Copy Algorithm," Proceedings of the 6$^{th}$ International Conference on Data Engineering, Feb. 5–9, 1990, Los Angeles, CA, pp. 430–437.

John Wilkes, "The DataMesh research project," Transputing '91 vol. 2, 1991, pp. 546–553.

Janet Wiener, "A parallel implementation of RAID for DataMesh," HPL–CSP–91–23, Aug. 21, 1991.

Bob Duzett and Rob Buck, "An Overview of the nCUBE3 Supercomputer," 1992, pp. 458–464.

Steve Rose, "Large–Scale Video on Demand An Investigation of Storage, Retrieval, and Switching," Viaduct Corp., Mar. 23, 1992.
S. Chen and D. Towsley, "The Design and Evaluation of RAID5 And Parity Striping Architectures," Journal of Parallel and Distributed Computing, 1993, pp. 41–57.
A.L.N. Reddy, et al., "Design and Evaluation of Gracefully Degradable Disk Arrays," Journal of Parallel and Distributed Computing, 1993, pp. 28–40.
Garth A. Gibson, Performance and Reliability in Disk Arrays, VLDB 1993 Tutorial 1.
Edward K. Lee and Randy H. Katz, "An Analytic Performance Model of Disk Arrays," Sigmetrics, 1993, pp. 98–109.
Andrew Witkowski, et al., "NCR 3700—The Next–Generation Industrial Database Computer," Proceedings of the 19$^{th}$ VLDB Conference, Dublin, Ireland, 1993, pp. 230–242.
"Time Warner is discussing . . . ," USA Today, Apr. 13, 1993.
Pei Cao, et al.., "TickerTAIP—a parallel RAID Array," ISCA Conference, May 6, 1993.
Pei Cao, et al., "The TickerTAIP parallel RAID architecture," 20Annual International Symposium on Computer Architecture Conference Proceedings, May 16–19, 1993, pp. 52–63.
Gary A. Mastin, et al., "A Massively Parallel Digital Processor for Spotlight Synthetic Aperture Radar," International Journal of Supercomputer Applications, vol. 7, No. 2, Summer 1993, pp. 97–112.
Engineering Specification—High Availability Storage Subsystem Fault Bus, Order No. EK–Fault–ES.A01, Digital Equipment Corp., Sep. 1993.
William Bailey, "Video Server Engine," Dec. 9, 1993.
Alexander Thomasian and Jai Menon, Performance Analysis of RAID5 Disk Arrays with a Vacationing Server Model for Rebuild Mode Operation, ICDE, 1994, pp. 111–119.
"Time Warner will put interactive television to the test in Orlando," Star Tribune (Minneapolis, MN), Mar. 27, 1994.
S.W. Ng, "Sparing for Redundant Disk Arrays," Distributed and Parallel Databases, vol. 2, Apr. 1994, pp. 133.
Andrew Laursen, et al., "Oracle Media Server: Providing Consumer Based Interactive Access to Multimedia Data," Sigmod 94, May 1994, pp. 470–477.
Mike W. Perry, "Microsoft's Tiger Unleashed," May 19, 1994 (Printed Aug. 8, 2000) <http://www.cni.org/Hforums/roundtable/1994–02/0172.html≦.
Peter M. Chen, et al., "Performance and Design Evaluation of the RAID–II Storage Server," Distributed and Parallel Database, vol. 2, No. 3, Jul. 1994, pp. 243–260.
Jai Menon, "Performance of RAID5 Disk Arrays with Read and Write Caching," Distributed and Parallel Databases, vol. 2, No. 3, Jul. 1994, pp. 261–293.
Mark Holland, et al., "Architectures and Algorithms for On–Line Failure Recovery in Redundant Disk Arrays," Distributed and Parallel Database, vol. 2, No. 3, Jul. 1994, pp. 295–335.
Pei Cao, et al., "The TickerTAIP parallel RAID Architecture," ACM Transactions on Computer Systems, vol. 12, No. 3, Aug. 1994, pp. 236–269.
Vince O'Malley, "nCUBE I/O Subsystem Functional Specification," Rev. A.2, Aug. 23, 1994.
Thomas D.C. Little and dinesh Venkatesh, "Prospects for Interactive Video–on–Demand," IEEE Multimedia, vol. 1, No. 3, Fall 1994, pp. 14–1624.

Ji Zang, et al. ,"Carrying MPEG–2 Transport Streams Using AAL–5," ATM Forum Technical Committee, Sep. 14, 1994.
Al Kovalick, "An Introduction to the Hewlett–Packard MediaStream Server (Technology and Architecture), "Hewlett–Packard Co., Oct. 1, 1994.
George Gilder, "The Bandwidth Tidal Wave," Forbes ASAP, Dec. 5, 1994.
"Testing interactive TV; Time Warner shows off TV of future," USA Today, Dec. 15, 1994.
Oracle Media Server for British Telecom, Version 1.4.2.1 Beta Release Notes, Dec. 23, 1994.
Edward K. Lee, Highly–Available Scalable Network Storage,' COMPCON, 1995, pp. 397–402.
NCUBE 3 Technical Overview, PN 104264, Rev. 0.2 Beta, nCUBE Corp., Feb. 22, 1995.
Oracle Media Server/Oracle Media Net, V1.4 Major Features List (Draft) Feb. 14, 1995.
Oracle Media Server and Oracle Media Note Release 1.4.5 Functionality, Mar. 20, 1995.
"TV of future stuck in present" St. Petersburg Times, Apr. 21, 1995.
Garth A. Gibson, "Storage Technology: RAID and Beyond," SIGMOND Conference, May/Jun. 1995.
Oracle Product Deliverable for Tele–TV, Phase 3, Part 1, Aug. 7, 1995.
Michael N. Nelson, et al., "A Highly Available, Scalable ITV Systems" SIGOPS '95, Dec. 1995, pp. 54–67.
"Time Warner Begins Interactive Cable in Florida," The New York Times, Dec. 28, 1995.
Oracle Video Server data sheet, 1996.
Oracle Media Server V1.5.x External Features, Jan. 25, 1996.
John Wilkes, et al., "The HP AutoRAID hierarchical storage System," ACM Transactions on Computer Systems, vol. 14, No. 1, Feb. 1996, pp. 108–136.
"Oracle Video Server System Tour," Release 3.0 Beta, 1997.
Guillermo Alvarez, et al., "Storage Systems Management," International Conference on Measurement and Modeling of Computer Systems (Sigmetrics), Santa Clara, CA, Jun. 2000.
William J. Bolosky, et al., "The Tiger Video Fileserver," (Printed Aug. 3, 2000) <http://www.research.microsoft.com/research/os/bolosky/tigertiger.html>.
William J. Bolosky, et al., "Distributed Schedule Management In the Tiger Video Fileserver," (Printed Aug. 8, 2000) <http://www.research.microsoft.com/research/os/bolosky-sosp/cdrom.html>.
Miranda Ko and Irene Koo, "An Overview of Interactive Video On Demand System," (Printed Aug. 8, 2000) <http://www.ece.ubc.ca/home/comlab1/irenek/etc/www/techpaps/vod/vod.html>.
"Microsoft Multicast IP & Windows Media Technologies Deployment," (Printed Aug. 8, 2000) <http://www.microsoft.com/TechNet/showcase/deploy/wmwpr.asp.html>.
Fent Shi and Andy Hopper, "A Network Striped Storage System For Video On Demand."
M. Morris Mano, Computer System Architecture 2$^{nd}$ Ed. 1982, Ch. 11, Section 11–7, "Multiprocessor System Organization," pp. 454–458.
M. Morris Mano, Computer System Architecture 3$^{rd}$ Ed. 1993, Ch. 13, Section 13–2 Interconnection Structures,' pp. 491–500.
NCUBE1, nCUBE2, nCUBE3, systems and related documentation and publications.

Microsoft Corporation's Tiger project and related documentation and publication.

Hewlett–Packard's TickerTAIP project, including prototype System, source code and related documentation and publications.

VAX cluster product and related publications.

*Seachange v. Ncube*, Kotz Expert Report, dated Aug. 25, 2000, pp. 1–19, Exhibit A.

*Seachange v. Ncube*, Kotz Rebuttal Expert Report, dated Sep. 1, 2000, 1–19, Exhibit A.

*Seachange v. Ncube*, Rhyne Expert Report, dated Aug. 25, 2000, pp. 1–31.

*Seachange v. Ncube*, Rhyne First Supplemental Expert Report, dated Sep. 1, 2000, pp. 1–7.

*Seachange v. Ncube*, Wilkes Expert Report, dated Aug. 23, 2000, pp. 1–13, Exhibits A & B.

*Seachange v. Ncube*, Wilkes Rebuttal Report, dated Sep. 1, 2000.

*Seachange v. Ncube*, Berson Expert Report, dated Aug. 24, 2000.

"Distributed Raid—A New Multiple Copy Algorithm", M. Stonebraker et al., 1990 IEEE Comp. Soc. Press, vol. Conf. 6, Feb. 5, 1990, pp. 430–437.

"Design of a Large Scale Multimedia Storage Server", M.M. Buddhikot et al., Computer Networks and ISDN Systems, NL, North Holland Publishing Amsterdam, vol. 27, Dec. 1, 1994, pp. 503–517.

"Continuous Retrieval of Multimedia Data Using Parallelism", S. Ghandeharizadeh et al., IEEE Transactions on Knowledge and Data Engineering, US, IEEE Inc., New York, vol. 5, No. 4, 8/93, pp. 658–669.

"Swift/RAID: A Distributed RAID System", D.D.E. Long et al., Computing Systems, 1994, pp. 333–359.

"Computer Multimedia Storage Architectures', B.A. Gennart et al., Proc. On Int. Conf. On Multimedia Computing and Systems", 5/95, pp. 323–328.

Cabrera, F. et al., "Swift : Using Distributed Disk Striping to Provide High I/O Data Rates Computing systems" 4(4): 405–436 1991.

* cited by examiner

| Proc 12a | Proc 12b | Proc 12c | Proc 12d | Proc 12e |
|---|---|---|---|---|
| Block 1 | Block 2 | Block 3 | Block 4 | Parity(1-4) |
| Parity(5-8) | Block 5 | Block 6 | Block 7 | Block 8 |
| Block 9 | Parity(9-12) | Block 10 | Block 11 | Block 12 |
| Block 13 | Block 14 | Parity(13-16) | Block 15 | Block 16 |
| ⋮ | ⋮ | ⋮ | ⋮ | ⋮ |

| Offset | Byte 3 | Byte 2 | Byte 1 | Byte 0 |
|---|---|---|---|---|
| 0 | Logical Id | Member Count | Minor Version | Major Version |
| 4 | Cluster Volume Id ||||
| 8 | Cluster Volume Incarnation ||||
| 12 | Cluster Volume Creation Time(Low) ||||
| 16 | Cluster Volume Creation Time(High) ||||
| 20 | Cluster Volume State ||||
| 24 | Cluster Volume Name ||||
| 28 | Cluster Volume Name ||||
| 32 | Cluster Volume Name ||||
| 36 | Cluster Volume Name ||||
| 40 | Cluster Volume Name ||||
| 44 | Cluster Volume Name ||||
| 48 | Cluster Volume Name ||||
| 52 | Cluster Volume Name ||||
| 56 | MBZ ||||
| 60 | MBZ ||||
| 64 | MBZ ||||
| 68 | MBZ ||||
| 72 | MBZ ||||
| 76 | MBZ ||||
| 80 | Cluster Home Block Checksum ||||

FIG. 6

| Field Name | Length | Default Value | Description |
|---|---|---|---|
| Major Version Number | 1 Byte | 1 | The major version defines the format of the cluster volume. |
| Minor Version Number | 1 Byte | 0 | The minor version of the cluster volume format. |
| Member Count | 1 Byte | NA | Defines the number of cluster members participating in this cluster volume. |
| Logical Id | 1 Byte | NA | Defines the unit id of the local cluster volume within the cluster volume. |
| Cluster Volume Id | 4 Bytes | NA | This is the identifier for the cluster volume. It is assigned when the volume is created and is never modified. |
| Cluster Volume Incarnation | 4 Bytes | NA | This incarnation is used to detect cluster members with stale cluster volume data. |
| Cluster Volume Creation Time | 8 Bytes | NA | The time and date the cluster volume was created. |
| Cluster Volume State | 4 Bytes | NA | the current state of the cluster volume, TBS. |
| Cluster Volume Name | 32 Bytes | NA | The name of the cluster volume. |
| MBZ | 24 Bytes | NA | Reserved. Must be zero. |
| Cluster Home Block Checksum | 4 Bytes | NA | Checksum of the Cluster Volume Home Block. |

FIG. 6A

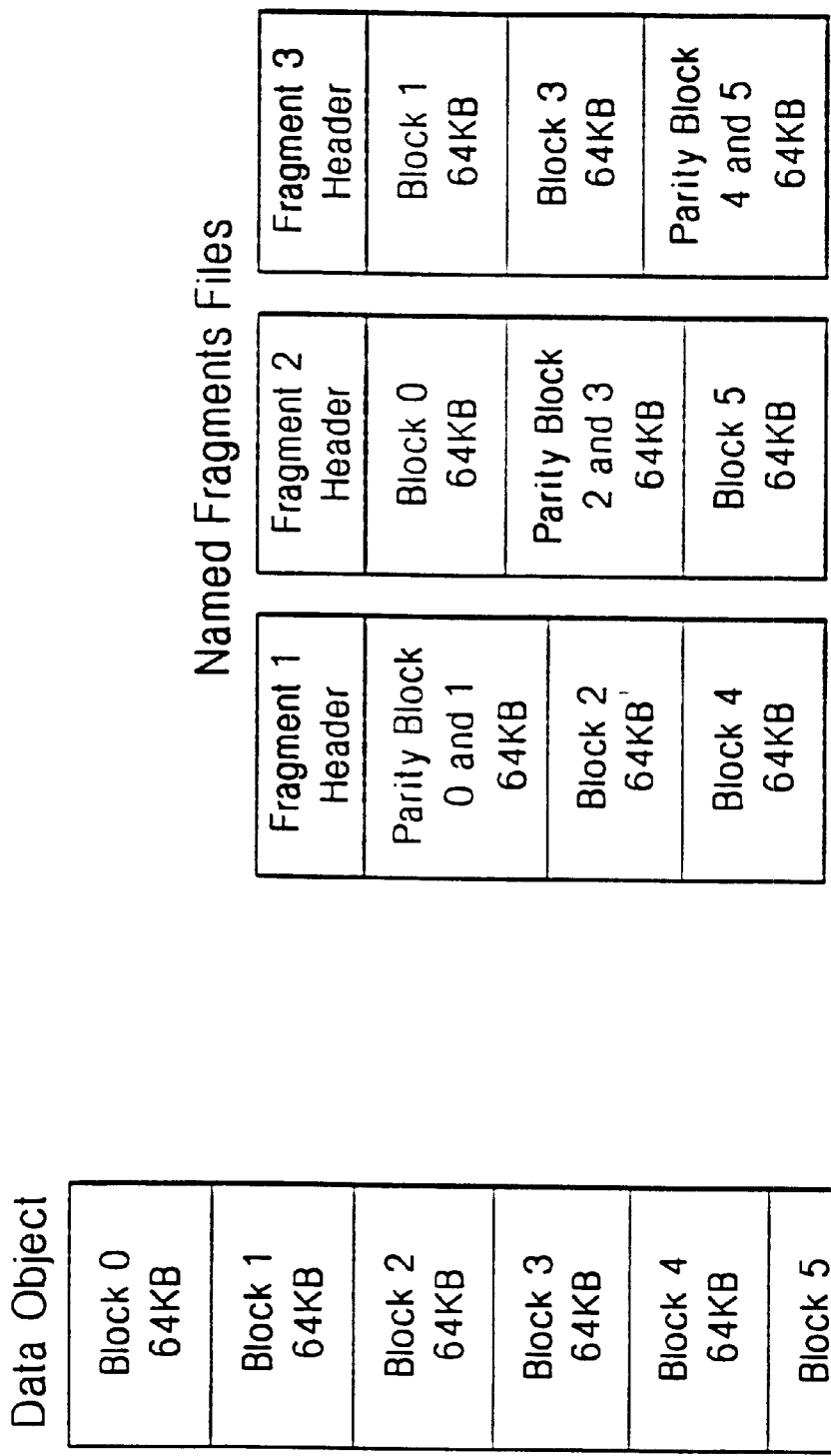

| Offset | Byte 3 | Byte 2 | Byte 1 | Byte 0 |
|---|---|---|---|---|
| 0 | RAID Level | Fragment Count | Minor Version | Major Version |
| 4 | Data Object Stripe Size ||||
| 8 | Data Object Incarnation ||||
| 12 | Named Fragment File Creation Time(Low) ||||
| 16 | Named Fragment File Creation Time(High) ||||
| 20 | Data Object Name ||||
| 24 | Data Object Name ||||
| 28 | Data Object Name ||||
| 32 | Data Object Name ||||
| 36 | Data Object Name ||||
| 40 | Data Object Name ||||
| 44 | Data Object Name ||||
| 48 | Data Object Name ||||
| ... | ... ||||
| 504 | MBZ ||||
| 508 | Header Block Checksum ||||

| Field Name | Length | Default Value | Description |
|---|---|---|---|
| Major Version Number | 1 Byte | 1 | The major version defines the format of the cluster volume. |
| Minor Version Number | 1 Byte | 0 | The minor version of the cluster volume format. |
| Fragment Count | 1 Byte | NA | Defines the number of fragments composing the data object. |
| Raid Level | 1 Byte | 5 | RAID 0(0) or RAID 5(5) |
| Data Object Stripe Size | 4 Bytes | 64KB | Stores the stripe size of the data object in bytes. |
| Data Object Incarnation | 4 Bytes | NA | This incarnation is used to detect cluster members with stale cluster volume data. |
| Data Object Creation Time | 8 Bytes | NA | The time and date the cluster volume was created. |
| Data Object Name | 32 Bytes | NA | The name of the cluster volume. |
| MBZ | 24 Bytes | NA | Reserved. Must be zero. |
| Header Block Checksum | 4 Bytes | NA | Checksum of the Cluster Volume Home Block. |

| Local Block Number | Cluster Member 0 | Cluster Member 1 | Cluster Member 2 |
|---|---|---|---|
| 0 | Parity Block 0/1 | Block 0 | Block 1 |
| 1 | Block 2 | Parity Block 2/3 | Block 3 |
| 2 | Block 4 | Block 5 | Block 4/5 |
| 3 | Parity Block 6/7 | Block 6 | Block 7 |

FIG. 7

| Variable | Acronym | Description |
|---|---|---|
| Block Number | BN | Block Number to be located |
| Parity Block Count | PBC | Parity Block Count up to the last row |
| Adjusted Block Number | ABN | Block Number plus Parity Block Count |
| Optional Parity Count | OPC | Optional Parity Block in last row |
| Final Block Number | FBN | Adjusted Block Number plus Optional Parity Count |
| Cluster Member | CM | Cluster member storing final block number |
| Local Block Number | LBN | Cluster Member Local Block Number |
| Parity Block Number | PBN | Parity Block Number for Block Number |
| Cluster Size | CS | Number od Cluster Members |

FIG.8

|  | Normal | Fail Up | Fail Down |
|---|---|---|---|
| SW1 (180) | 2 | 1 | 3 |
| SW2 (182) | x | 3 | 1 |
| SW3 (184) | 1 | 4 | 1 |
| SW4 (186) | No Insert: 2 / Insert: 1 | No Insert: 2 / Insert: 5 | No Insert: 2 / Insert: 4 |

FIG. 17

LOOSELY COUPLED MASS STORAGE COMPUTER CLUSTER

This application is a continuation (and claims the benefit of priority under 35 USC 120) of U.S. application Ser. No. 09/412,232, filed Oct. 5, 1999, which is a continuation of U.S. application Ser. No. 08/991,278, filed Dec. 16, 1997 now U.S. Pat. No. 5,996,089, which is a divisional application of U.S. application Ser. No. 08/547,565, filed Oct. 24, 1995 now U.S. Pat. No. 5,862,312. The disclosure of the prior application is considered part of (and is incorporated by reference in) the disclosure of this application.

The invention relates generally to mass storage device interconnections and in particular, to a method and apparatus for increasing delivery bandwidth, providing fault tolerance, and input/output load balancing in a multiprocessor computer cluster.

BACKGROUND OF THE INVENTION

Modern reliable computer systems require a large capacity mass storage, and large bandwidth access to that mass storage. While disk sizes have increased substantially, for example a typical personal computer today can be configured with over a gigabyte of storage, the bandwidth available to access the storage has improved, but not significantly. Thus, while large volumes of information can be stored, the rate at which the storage can be accessed has not generally changed in the past few years. In particular, considering the requirements of a digital video system for the delivery of constant bit rate video streams such as MPEG-2 digital video streams, it is important to provide a high bandwidth to accommodate the data requirements of the digital video network, for example an ATM OC-3 network interface.

While various methods have been employed to provide sufficient quantities of data in a reliable configuration, perhaps one of the more popular, and least expensive, approaches is the use of RAID-5 striping and parity techniques to organize data in a fault tolerant and efficient manner. The RAID (Redundant Array of Inexpensive Disks) approach is well described in the literature and has various levels of operation, including RAID-5, and the data organization can achieve data storage in a fault tolerant and load balanced manner.

In particular, RAID-5 provides that the stored data is spread among three or more disk drives, in a redundant manner, so that even if one of the disk drives fails, the data stored on the drive can be recovered in an efficient and error free manner from the other storage locations. This method also advantageously, using RAID-5 striping, makes use of each of the disk drives in relatively equal and substantially parallel operations. Accordingly, if one has a six gigabyte cluster volume which spans three disk drives, each disk drive would be responsible for servicing two gigabytes of the cluster volume. Each two gigabyte drive would be comprised of one-third redundant information, to provide the redundant, and thus fault tolerant, operation required for the RAID-5 approach.

Consider a processor reading a video data object from a local RAID-5 array. In normal operation, using a RAID-5 approach, when the processor needs to access a video data object which is spread across all of the disk drives connected to the processor, the processor reads a portion of the video data object in a round robin fashion from each of the disk drives. For example, a first 64 kilobyte block of the video data object can be stored and read on a first drive, the next 64 kilobyte block being stored on the second drive, and so on. In addition, however, the parity check (actually an EXCLUSIVE-OR function), also a 64 kilobyte block, is stored so that if there were n disk drives there would be one parity block written for each n−1 blocks of data.

The processor reading the disk drives, however, is still "stuck" with a relatively narrow bandwidth. Accordingly, the amount of data which can be read is limited by the bus to which the drives are connected. For example, a SCSI bus which, while providing substantial improvements over buses from years ago, is still relatively slow compared to the needs of video applications. Also, the use of a local RAID-5 controller can combine the outputs of multiple local SCSI buses, but is subject to the failure of the local processor. Such a failure eliminates access to all the data.

Accordingly, objects of the invention are a method and apparatus having improved and increased mass storage read and write bandwidth (delivery bandwidth), operating using a reliable and fault tolerant protocol in a novel topology and enabling large quantities of data to be read and written in accordance with well known and accepted techniques. Other objects of the invention include a method and apparatus which is relatively inexpensive, reliable, simple to build, and easy to maintain.

SUMMARY OF THE INVENTION

The invention relates to a method and apparatus for redundantly storing data in a distributed computer system having at least three processor systems, each processor system having at least one central processing unit and at least one mass storage sub-system. The method features the steps of interconnecting each one of the processor systems in a point to point two way channel interconnection with each other one of the processor systems and storing input data across the processor systems according to a distributed, redundant storage process. Thereby, data is stored at each mass sub-storage system and some of a redundant representation of the data is stored also at each processor mass storage sub-system.

In particular aspects of the invention, the method features storing data across the processor systems according to a RAID-5 process and, further, storing data within each processor system according to a RAID-5 process.

The method further features the step of reading data from the computer system, in the absence of a failure of any of the processor systems, over respective ones of the data channel interconnections, whereby the reading step establishes a load balance across the processor systems. In the presence of a failure of one of the processor systems, the reading of data from the computer system features the steps of reading data from each non-failed processor system storing the data, and reading redundant data from the non-failed processor systems in place of the data stored at the failed processor system. Thereafter, the needed data stored at the failed processor system can be recreated using the redundant data and the data read from the non-failed processor systems. In some embodiments of the invention, during the time when a failure has occurred at any processor system, the method may prevent the writing of any data at any processor system until the failed processor system is brought back on line.

In another aspect, the invention further features the limiting case wherein there are only two processor systems initially. In accordance with this aspect of the invention, the system continues, in the absence of a failure, to provide increased bandwidth by reading succeeding blocks of data from alternate processors in sequence; and, in this manner, effects a load balancing and provides increased read bandwidth compared to a typical so-called "mirrored" system. In a typical mirrored system, data is read from one processor only, the other processor acting as a backup. Thus, in accordance with the invention, data is read from all of the processors thereby providing an increased read bandwidth and load balancing. As noted hereinafter, therefore, the two processor version of the invention, while not providing all of the advantages of the system with a larger number of processors, does allow easy scalability to a processor system having greater capacity, less overhead, and greater bandwidth.

In various aspects of the storage step, the method, in some embodiments of the invention wherein data storage is modelled at a disk abstraction level, feature either designating one processor system to effect all write functions for the computer system, designating one processor for allocating files for each data input and enabling all processor systems to write input data to each of its associated and allocated files, or arbitrating write operations among the processor systems using a distributed lock manager.

In another aspect of the storage step, however, the data input is stored as named fragment files, or named files, in each processor system. When stored as named fragment files, or named files, they can be accessed and reconstructed, for example even when a process or system is added to the distributed computer system. The system continues to deliver stored data as an output stream even as the number of processor systems, network interfaces, and amount of storage is changed. This is possible because the method uses file names to distinguish, modulus "N", data fragments from modulus "N+1" data fragments, even as these modulus "N+1" data fragments are created from the modulus "N" fragments. Further, the method features the step of reconstructing a failed processor system by reconstructing only the data objects which were written while the processor system was in a failed state.

The distributed computer system in accordance with the invention has at least three processor systems for redundantly storing data, each processor system having at least one central processing unit and at least one mass storage system. The distributed computer system features interconnecting channels providing a point to point two way channel interconnection from each one of the processor systems to each other one of the processor systems, and a data storage controller at each processor system. The controllers act to store data input at any one of the processor systems according to a distributed redundant storage process whereby data is stored at each of the computer processors and some of a redundant representation of the data is stored also at each of the processors. In a preferred embodiment, the storage controllers store data across the processing systems according to a RAID-5 process, and further, can store data at each processor system in its associated mass storage sub-system according to a RAID-5 process.

The apparatus of the invention further features a system in which the controllers read data from the computer system, in the absence of a failure of any processor system, so as to maintain and establish a load balance across the computer system. In the presence of a failure of one of the processor systems, the controllers read data from each non-failed processor system storing the data (over the appropriate dedicated network connection) and read redundant data from each non-failed processor system in place of the data stored at the failed processor system. The requesting processor system can then recreate the data stored at the failed processor using the read data and the redundant data. In a preferred embodiment, an "external" processor can be employed to recreate the data stored at the failed processor, thereby preserving the delivery bandwidth of the system even in the face of a failed processor.

In another aspect, the apparatus features a storage controller which stores the input data as named fragment files, or named files, in the distributed computer system.

The apparatus of the invention also relates to a redundant switch having at least n interruptible inputs, n interrupting inputs, and n outputs. The redundant switch features n+1 switched systems, each switched system having at least two control inputs, a first input, a second input, a third input, and a fourth input, and a first and a second output. Each switched system is connected at its second output to an interrupting signal generator, n interrupting outputs of the associated signal generator being connected to the second input of the connected switched system. The switched systems are interconnected in a ring structure so that each switched system further has n interruptible input signals connected to the first input, the second input of a first neighbor switched system in the ring being connected to the third input, the interruptible input from the other neighbor switched system on the ring being connected to the fourth input, and each switched system having switching circuitry responsive to the control input for switching any of its inputs to at least its first output and for connecting either of its first and fourth inputs to its second output. The controller provides the control signals to the control inputs of the switched system to enable the cross-bar operation.

In another aspect, the redundant switch has n+1 switched systems each switched system having at least two control inputs, four signal inputs, and two signal outputs. Each switched system is connected at one of its outputs to an associated interrupting signal generator and n interrupting output of the associated signal generator is connected to an input of the connected switched system. The switched systems are interconnected in a ring structure so that each switched system is connected to a first and a second nearest neighbor. Each switched system has switching circuitry responsive to the control input for the switched system for selectively switching its inputs to its outputs. A controller provides the control inputs to the switched systems to enable the switched systems to effectively rotate signal switching functions one position in one or both directions around the ring. Thereby, a failed signal generator can be bypassed and the signals on the n first outputs continue uninterrupted.

In another aspect, the invention relates to a distributed data delivery system having at least three processor systems for redundantly storing data, each processor system having at least one central processing unit and one mass storage system. Interconnecting data channels provide a point to point, two way, channel interconnection from each one of the processor systems to each other one of the processor systems. A data storage controller at each processor system stores data input from any one of the processor systems according to a distributed, redundant storage process whereby data is stored at each of the processor systems and some of a redundant representation of the data is stored at each of the processors as well. A switching circuit having n interruptible input ports, at least n+1 interrupting input ports, and at least n+1 output ports, has n interruptible input signals connected to respective primary processor systems, each primary processor system having an output connected to a respective interrupting input. A switching controller, connected to the switching circuit for selectively interrupting each of the n interruptible input ports with the signal information available from a respective one of the processor systems, in the event of a failure at a processor, and using a previously unused processor system in that process, causes the switching circuit to connect the interruptible input port of the failed processor system to a different processor system, and to replace the output of the failed processor system with the output of another processor system.

BRIEF DESCRIPTION OF THE DRAWINGS

Other objects, features, and advantages of the invention will be apparent from the following drawings taken together with the description of a particular embodiments in which:

FIG. 6 describes the cluster volume HomeBlock format in accordance with the invention;

FIG. 6A is a table defining the HomeBlock format of FIG. 6;

FIG. 6B shows a data object broken into a plurality of blocks;

FIG. 6C shows the relationship of a data object to its stored named fragment files;

FIG. 6D is a table defining the header block of a named fragment file according to one embodiment of the invention;

FIG. 6E is a table defining the data object format of FIG. 6D;

FIG. 7 illustrates the data and parity organization for a data object according to a RAID-5 striping protocol;

FIG. 8 is a table describing the terminology used in connection with the flow chart of FIG. 9;

FIG. 17 illustrates a truth table for the switched system of FIG. 16 in accordance with the invention.

DESCRIPTION OF THE PREFERRED PARTICULAR EMBODIMENTS

Figure 1:
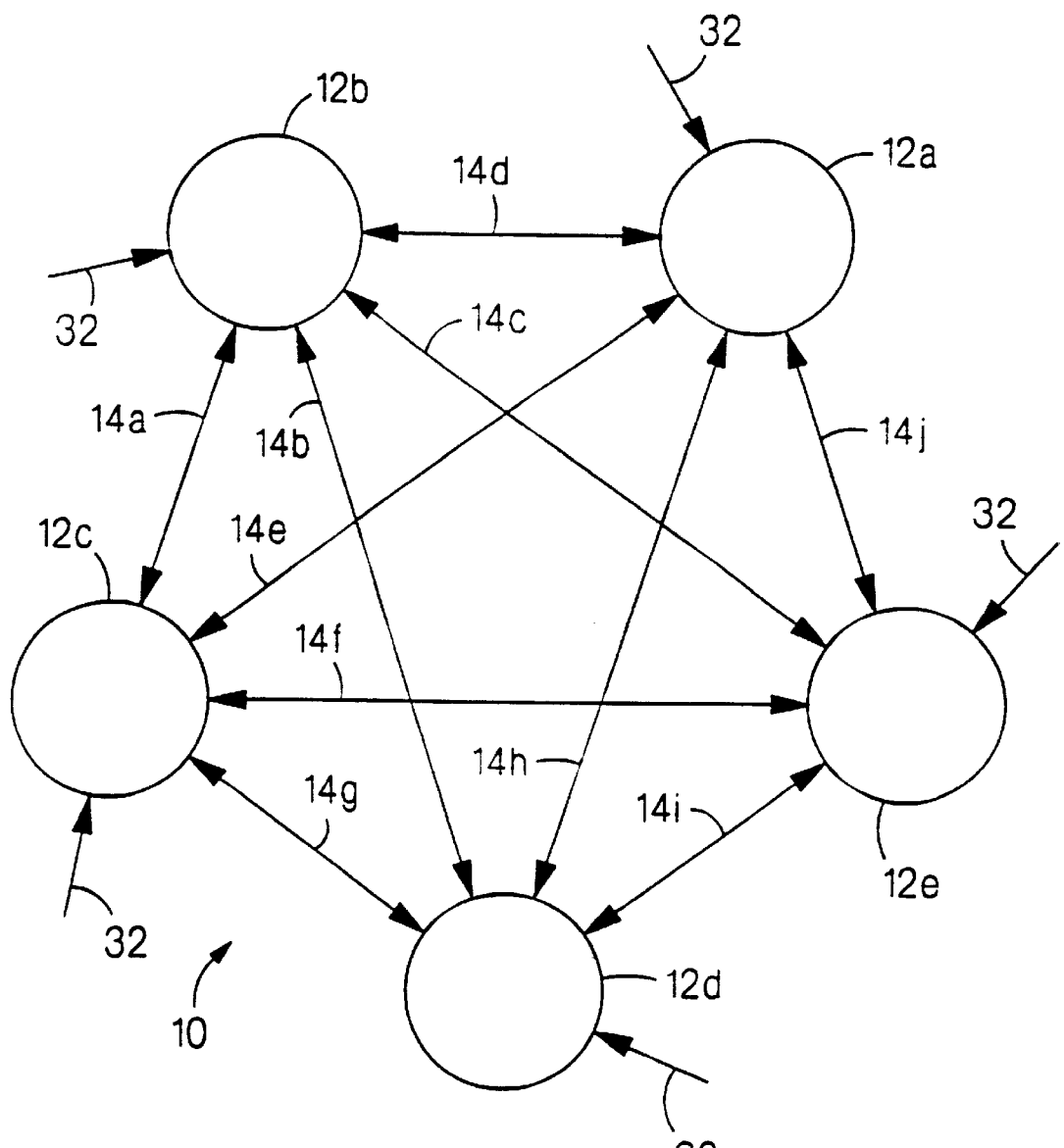
FIG. 1 is a schematic block diagram of an interconnected computer system according to the invention.

Referring to FIG. 1, a redundant distributed computer system 10 has a plurality of processor systems 12a, 12b, 12c, 12d, 12e, in the illustrated embodiment, which are interconnected by interconnecting channels 14a, 14b, 14c, . . . 14j in a plurality of point to point channel interconnections. Thus, each processor system 12 is directly connected in a point to point connection to each other processor system. In other embodiments of the invention, more or less processor systems can be used, although a practical upper limit may be between nine and thirteen and the lower limit is three. (As noted earlier, a two processor system, can be used, to effect some of the advantages of the invention; however, for purposes of description hereinafter, the three or more processor embodiment will be detailed.)

Figures 2, 3:
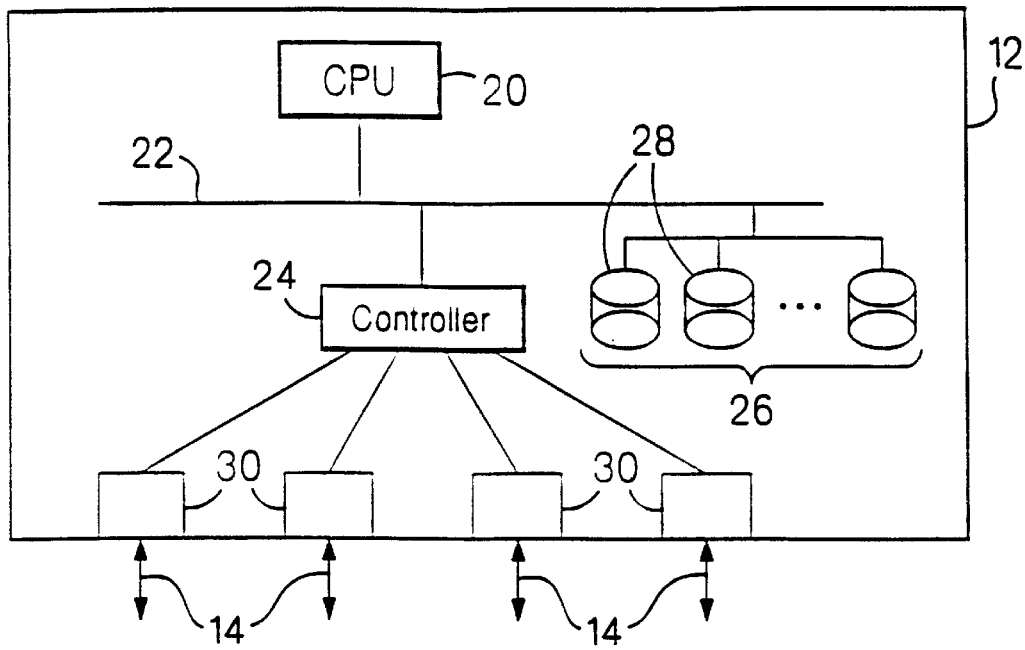
FIG. 2 is a more detailed block diagram of a processor system according to the invention.
FIG. 3 is a table illustrating an index file in accordance with the invention.

Referring in more detail to each processor system 12, and referring to FIG. 2, each processor system 12 has a CPU 20 connecting, in the illustrated embodiment, to an internal data communications bus 22, to which are connected at least a memory and communications controller 24 and a mass memory storage unit 26. The mass storage unit typically has a plurality of disk drive units 28. Controller 24 is also connected to a plurality of channel interface units 30, each of which is connected to a different interconnecting channel 14 for establishing the point to point communications with other processor systems through their respective channel interface units 30.

In the illustrated embodiment of the invention, the interconnecting channels 14 use a protocol running on Fast Ethernet datalink devices. This protocol provides a relatively high efficiency and enables communications between processors, in the illustrated embodiment, at a bandwidth on the order of 100 megabits/sec. Accordingly, referring to FIG. 1, each processor 12, being connected to four interconnecting channels, has a bandwidth to the external processor memories of approximately 400 megabits/sec. (less overhead), in addition to its own capabilities with regard to its local mass storage 26.

In one particular application of the computer system illustrated in FIG. 1, video input information and data is provided to one or more processor systems 12 over external feedlines, for example, network feeds 32 which require high bandwidth storage of the substantial data needed to represent and store even small durations of video data (including audio). In particular, for example, one minute of video data can require sixty-six megabytes of storage. Fortunately, the particular embodiment described herein and displayed in FIG. 1 has substantial bandwidth to enable the video information to be distributed among the various processor systems so that in a preferred embodiment of the invention the video data input to one of the processor systems 12 is actually stored along many, and preferably all of the video processor systems 12.

In accordance with a particular embodiment of the invention, the controllers 24 of the processor systems 12 individually and collectively act to store data across the entire computer system 10 network in a redundant fashion so that if any one processor system 12 fails the remaining processor systems can nevertheless reconstruct all the data available in the entire system. In addition, this approach, as will be described in more detail below, provides, in the illustrated embodiment, load balancing across the various processing systems as well as enabling any one processor system requiring either to read or write data the capability of a very large bandwidth memory communication channel.

In the preferred embodiment of the invention, a RAID-5 architecture is implemented, for the first time, at the system level to provide the redundancy, load balancing, and bandwidth necessary to meet the objectives of the distributive computer system. In a particular application, assuming that video data is to be received by processor system 12e on input line 30, the computer system 10 will have, before receipt of the data, allocated storage in each of the processor systems in one of a plurality of different ways. In one method, but not the preferred method which will be described hereinafter, a storage cluster volume having a specified capacity will be deployed among the processor systems 12. For example, if the storage cluster volume was 10 gigabytes, in the embodiment of FIG. 1, each processor system would be responsible for servicing two gigabytes of the cluster volume for use not only for itself, but for the other processor systems or members of the cluster.

Under normal operating conditions therefore the systems will have preestablished a protocol for both writing and reading data. According to one protocol, the systems will have selected one system for writing of all data for the cluster volume. In another aspect of the invention, a distributed lock may be used to arbitrate write operations among the processor systems. In a third embodiment, one processor system can allocate files for each data input and thereafter enable each of the processor systems to write input data to its associated allocated files.

The cluster volume described above is a collection of logical disk blocks (some local and some remote) that are shared between cluster members (the different processor systems of the cluster). In this design, each cluster member has an instance of a file system running, and each node would have access to the entire set of logical blocks. While this solution works, it has several problems. First, only one system can write to the cluster volume; second, the integrity of the cluster volume has to be strictly managed; and third, changes to the file system structure (the creation or deletion of files) has to be replicated in each instance of the file system running on each cluster member.

Rather than use the cluster volume structure identified above, in a preferred embodiment of the invention, the cluster architecture provides access to data objects and named fragment files, much in the way a file server provides "files" to network clients. Since the cluster members keep their file system private and only export access to the data objects, each cluster member can read, write, or delete files from its local file system without disrupting the other members of the cluster. There is no significant penalty for this method and it reduces the complexity of the cluster software. Data objects are then fragmented and written to the members of a cluster using the RAID-5 striping and parity techniques, allowing each individual data object to be read, recovered, or written independently of all other data objects. In addition, because all data objects are stored independently, only the data objects written while a cluster member is down need be recovered. In the cluster volume method, as will be described below, the entire local cluster volume has to be reconstructed. The reconstruction of the entire cluster volume can take anywhere from several hours to several days depending upon the size of a volume. When only the data objects are stored, only a small subset of the data will need to be reconstructed if written during the time when a cluster member is down.

In order to achieve a redundant, and hence fault tolerant, storage system, each of the processors 12 is viewed, even though they exist at the system level, in a RAID-5 context, with striping, as follows. Assuming that each processor writes in 64 kilobytes blocks, a first block will be sent to and written by processor 12a, a second block by processor 12b, a third block by processor 12c, a fourth block by processor 12d, and a fifth block, a redundancy block or ParityBlock by processor 12e. In accordance with the RAID-5 approach, the redundancy block or ParityBlock to be written by processor 12e in its mass storage will be the EXCLUSIVE-OR of the blocks sent to processors 12a, 12b, 12c, and 12d. Clearly, other redundancy methods can be used including various forms of, for example, Huffman coding and other redundant coding methods so that not only may one failure of a processor be taken into account but multiple processor failures can be taken into account. The cost, of course, is increased processing in both the writing and perhaps reading of data. Further, and importantly, because each processor is connected in a point to point two way connection to each other processor, it is possible to write all five blocks of data substantially in parallel, thus making full use of the bandwidth available to the writing controller and, at the same time, distributing substantially equally, the writing load across the entire computer system.

After the first four data blocks (and one redundancy block) have been written, the next block of data (a DataBlock) can be written to, for example, processor system 12b, the sixth block to processor system 12c, the seventh block to processor system 12d, and the eighth block to processor system 12e. Then, the parity or redundancy block would be written in processor system 12a. In accordance with this practice, each of the redundant blocks would be written in a determined and round robin, rotating manner, in accordance with the RAID-5 processing protocol. The location of the blocks is illustrated in FIG. 3. A short algorithm can be employed to determine the location of a particular block, as described in more detail below.

Further, within each processor system itself, the processors can use a RAID-5 protocol, in its ordinary and well known sense, to store data among its plurality of disk drive devices 26 associated with that processor. Thus, there is provided the novel circumstance of employing the RAID-5 technology twice, both at the storage level as is well known, but also at the system level, which is new, to achieve a high reliability, lower cost, computer system.

The structure of FIG. 1 as described herein has a number of constraints in order to maintain its proper functionality. First, each cluster volume must have at least three members. Second, a cluster cannot continue to operate, if it uses the RAID-5 protocol, if more than one cluster member should fail. (The use of other, more complex protocols, can relax, somewhat this constraint.) Third, it appears that a practical limit, under current operating parameters, is nine to thirteen cluster members. When more cluster members are employed, the point to point wiring becomes progressively more difficult and expensive. Indeed, nine cluster members would require thirty-six interconnecting channels while thirteen cluster volumes would have 78 interconnecting channels.

Figure 4:
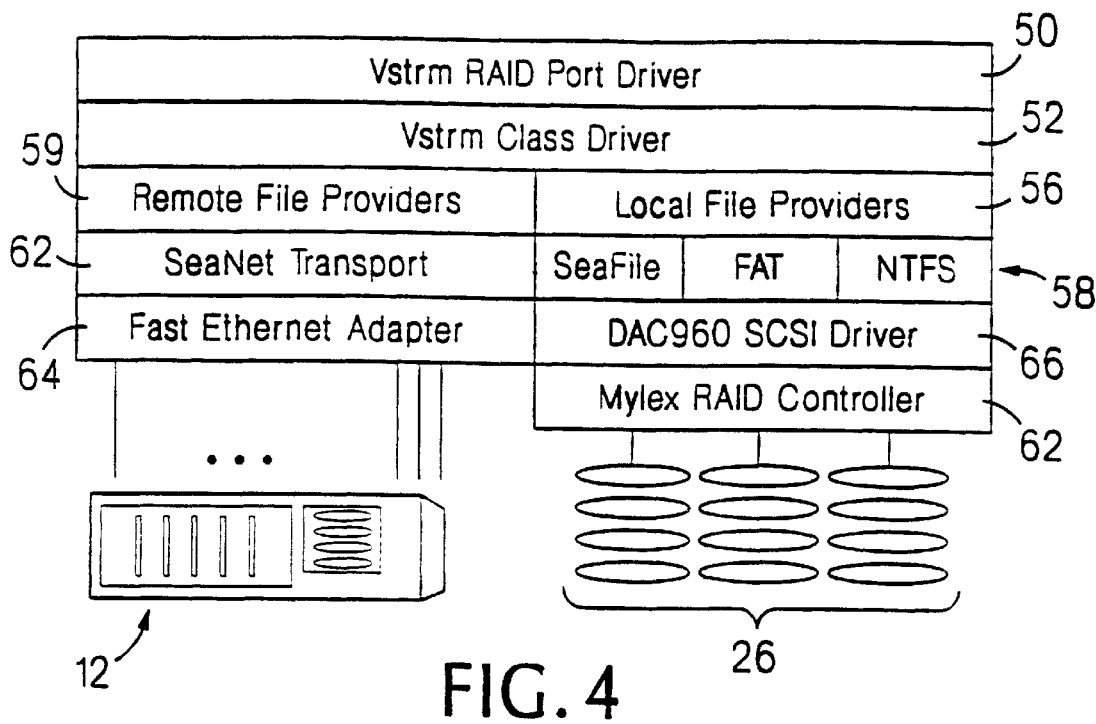
FIG. 4 is a diagram illustrating the software architecture in accordance with the invention.

Referring now to FIG. 4, the major software components of a single processor system 12 (also called a "cluster member") include a port driver 50, a class driver 52, a remote file provider 54 a local file provider 56, a file system 58 (SeaFile, FAT, NTFS), a SCSI driver 60, a RAID controller 62, a fast Ethernet adapter 64, and a SeaNet transport 66.

The cluster architecture utilizes RAID-5 technology to build a fault tolerant distributed system. The data objects are stored as named fragment files across the members of the cluster. Data objects are striped (in accordance with RAID-5-protocol) and stored with parity information to allow a missing named fragment file to be reconstructed if a cluster member fails. This is described in more detail below.

In order to provide transparent data object access, a RAID port driver masks the fact that the data object exists as a set of named fragment files. It provides the multiplexing and demultiplexing services to merge the named fragment files into a data object byte stream. The RAID port driver registers as both a provider and a consumer. When the class driver attempts to open a data object, it calls all the provider port drivers in the system. Upon being called, the RAID port driver becomes a consumer and uses the class driver to open each of the data fragments that comprise the data object. Once a session has been established to each of the named fragment files, that is, once access has been provided to each named fragment file, the RAID port driver performs an open call back to notify the class driver that the data object is available.

In the particular application of accessing the data (video) objects, the port driver accesses the data (video) objects stored on the cluster. The video named fragment files are read or written using RAID-5 methods from the local and remote providers. It masks other port drivers (for example, video decoders or ATM links) from any failures, since it will reconstruct missing data fragments in real time. The remote file provider represents any third party application or device driver that might use the cluster technology. Examples include Lotus Notes, medical applications, or database systems. The on-disk structure of the cluster volume (file system 54) can be either NTFS, FAT, SeaFile or raw disk access, in the illustrated embodiment.

The file system component is responsible for storing and retrieving the named fragment files.

The Transport component 66 provides an efficient network service to other cluster members. It detects and reports failures in real-time to the RAID driver. The fast Ethernet Adapter provides a 100 Mb/second full duplex link between each cluster member through interface units 30. The SCSI driver, for example a DAC960, provides access to local disk storage and allows the cluster RAID driver to read or write data for local file system managers.

A RAID controller provides efficient access to the named fragment files. The local portion of a data object is read or written by the RAID controller. The RAID controlled volume can be configured, to either a RAID-0, RAID-1, RAID-5, RAID-6 or RAID-7 level in the illustrated embodiment, and as noted above, configuring a volume in a RAID-5 protocol allows a cluster member to continue even when a single disk fails to perform properly.

As described above, when cluster volumes are used, a cluster volume is a logical disk volume that spans multiple cluster members or processor systems. considering a specific application, such as the storage and retrieval of video data objects, the design principal for a cluster volume is to utilize a fraction of each processor system memory for each video stream thus creating a balanced and scalable system. Since the video data stored in the cluster volumes is mission critical, the integrity of the cluster volume must be carefully maintained. Accordingly, a set of checks are used to ensure that the cluster members agree on a consistent view of the cluster volume and that only one cluster member writes to the cluster volume.

Figure 5:
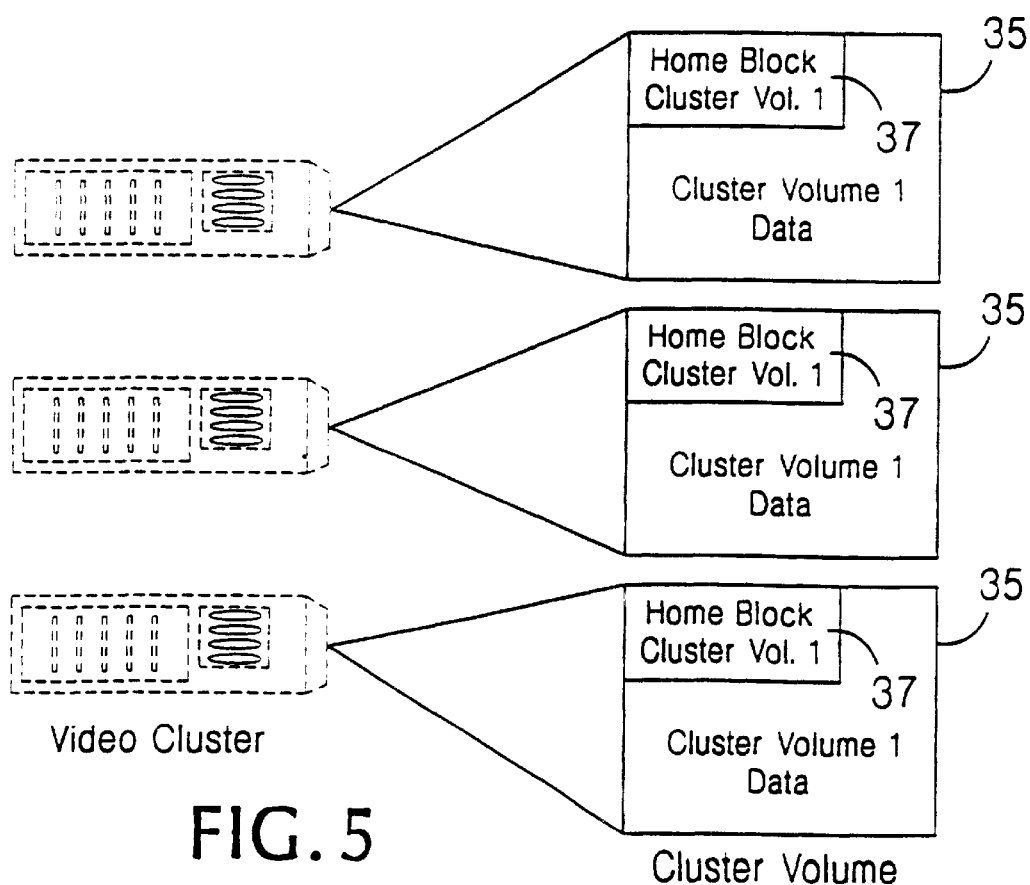
FIG. 5 illustrates the cluster volume arrangement according to the invention.

In the illustrated embodiment of the invention, and referring to FIG. 5, each cluster member of a cluster volume that is, each processor system 12, maintains and verifies its cluster volume "HomeBlock" to ensure the integrity of the cluster volume. When a cluster member processor system boots, it checks the cluster volume HomeBlock incarnation and volume identifier against the other cluster member processor systems HomeBlocks to ensure that the cluster volume was not modified while it was down. If the cluster volume was modified, a rebuild process can repair the out of date cluster member.

Accordingly, therefore, each cluster member 35, in the illustrated embodiment of the invention, has one cluster volume HomeBlock 37 for each cluster volume. Referring to FIGS. 6 and 6A, the various offsets and byte identifications are detailed for the preferred embodiment of the invention. The cluster volumes are organized using the RAID-5 protocol across the processor systems which are the members of the cluster. (Note that a cluster volume need not extend across all processors 12 of the system 10, but must extend across at least three processors, or two if mirroring is permitted.) The controllers organize the data and the writing controller writes blocks of data in a round robin fashion, as described above, across the cluster members participating in the cluster volume.

As noted above, in the preferred embodiment, data objects are employed. Each data object in this system is stored as a set of named fragment files. Each fragment file contains a header block that allows the named fragment file to be self describing. Data objects are fragmented when they are written to the cluster. FIGS. 6B and 6C illustrate the relationship of a data object to its named fragment files. As illustrated, a fragment file written on any individual cluster member includes the named fragment header and the plurality of blocks comprising the fragment file. In the example, the data object is fragmented into three files.

The amount of data in a block is called the volume stripe size. In the illustrated embodiment of the invention the default stripe size is 64 kilobytes. In addition to striping, the RAID-5 protocol uses a ParityBlock to recover from a single fault. The ParityBlock is written for every n minus 1 blocks where n is the number of cluster processor system members. This technique, as noted above, thus allows for the reconstruction of the cluster volume data when any one cluster member fails. In the preferred embodiment of the invention, parity blocks are created by EXCLUSIVE-OR'ing the n-1 DataBlocks forming a stripe level. For the preferred embodiment of the invention, wherein data is stored as data objects, FIG. 6D describes the named fragment file header format. As noted above, the header block describes the content of the fragment. FIG. 6E describes, in table form, the particular components of the header for one particular embodiment of the invention.

Figure 6F:
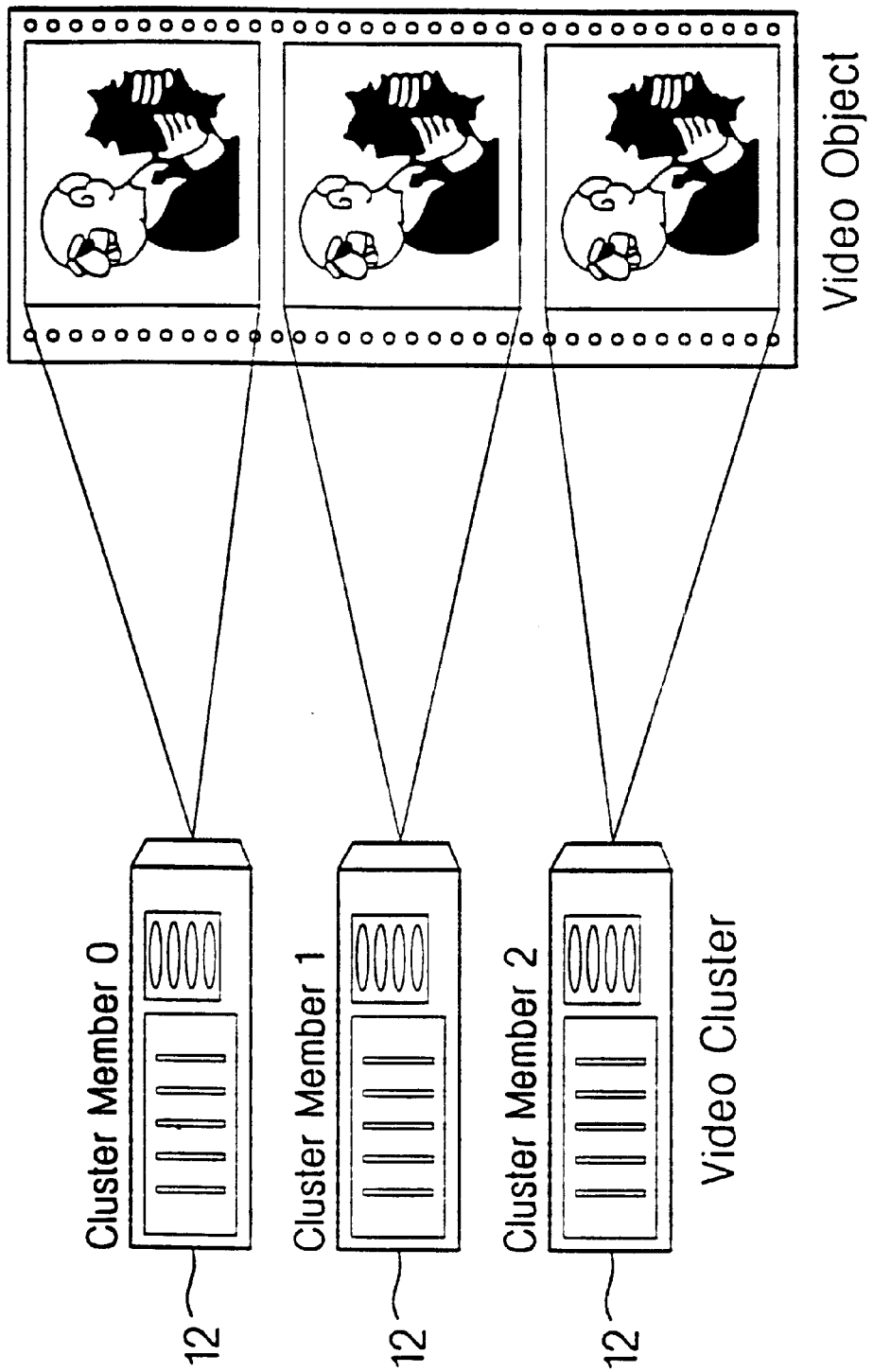
FIG. 6F illustrates reading a video object from the cluster members.

FIG. 6F illustrates reading the DataBlocks of a single video object spread across the members of a cluster. To play this video object, a cluster member opens each named fragment file and reads the first block from cluster member 0, for example, the second block from cluster member 1, and the third block, assuming no parity block, from cluster member 2. At this point the read process would cycle back to cluster member 0. The complexity of this process is hidden, as noted above, from the consumer by the RAID port driver. Since, in the above description, the parity blocks which are stored with the named fragment files were ignored, in fact when the video data object is read the parity blocks are skipped and only the actual data is read. The organization of the parity blocks thus introduces an additional complexity which must be attended to. The parity DataBlocks are also written, as noted above, in a round robin fashion to avoid a single set of disk heads from being left idle during the read process.

Accordingly, therefore, referring to FIG. 7, there is illustrated the organization wherein parity blocks are stored in each named fragment file on each cluster member.

During a failure, the blocks associated with a missing block are read to reconstruct the missing block. For example, if cluster member 2 were unavailable, and block 7 was requested, parity block 6|7 and block 6 would be read and EXCLUSIVE OR'd to generate the missing block. While it would certainly be possible to determine the location of a DataBlock using tables, in a preferred embodiment of the invention a algorithmic process is preferred and operates more quickly. In this illustrated embodiment, integer arithmetic is employed to locate data and parity blocks stored in named fragment files.

Referring to FIG. 8, there is illustrated a list of the variables used in a computer software program used to determine the location of a block. A flow chart of the program will now be described in connection with FIG. 9A. Initially, at 300, the number of parity blocks is first determined by dividing the block number to be located, by the cluster size minus 1. This, in essence, provides the number of parity blocks up to and but not including the row in which the block to be found resides. The division is integer division and the remainder is discarded. Thus, PBC provides the number of parity blocks up to and including the last complete row of blocks. Next, the so-called adjusted block number is set equal to the total number of blocks which have been stored, including the parity blocks within complete rows, up to the block to be found. This is indicated at 302.

The optional parity block count is determined next. To determine whether the parity block, in the row of the block to be found, is located before or after the block to be located, a quantity $ABN_L$, equal to the total number of blocks modulo the number of cluster members squared, is generated at 364. The optional parity count is set to "zero" at 306, and, if $ABN_L$ divided by the number of clusters is less than or equal to $ABN_L$ modulo the number of clusters at 308, the optional parity count is set to "one" at 310. A "zero" optional parity count indicates that the block is before the parity block in the row while a "one" optional parity count indicates that the block is after the parity block of the row. This assumes that the parity is configured as described in FIG. 6C.

The final block number is then the adjusted block number plus the value of OPC. This is indicated at 320. Then, the cluster member can be calculated by taking the final block number modulo the number of clusters. This is indicated at 330. The local block number within that cluster is then the final block number divided by the number of clusters. This is indicated at 340. (Recall that the first block number is zero.)

If a failure has occurred, the parity block number for the binary block number must be determined. This is performed as illustrated below, referring to the flow chart of FIG. 9B. First, a parity block number is determined by multiplying the number of clusters by the integer portion of a division, the numerator of which is the final block number and the denominator of which is the number of clusters. This is indicated at 400. Next, the parity block offset within the repeating pattern is determined and added to the parity block number (PBN) previously determined. This is accomplished by taking the final block number modulo the number of cluster members squared and dividing that number by the number of clusters. That value is then added to the parity block number to obtain the final value of the parity block number. This is indicated at 420.

Figures 9A, 9B, 9C:
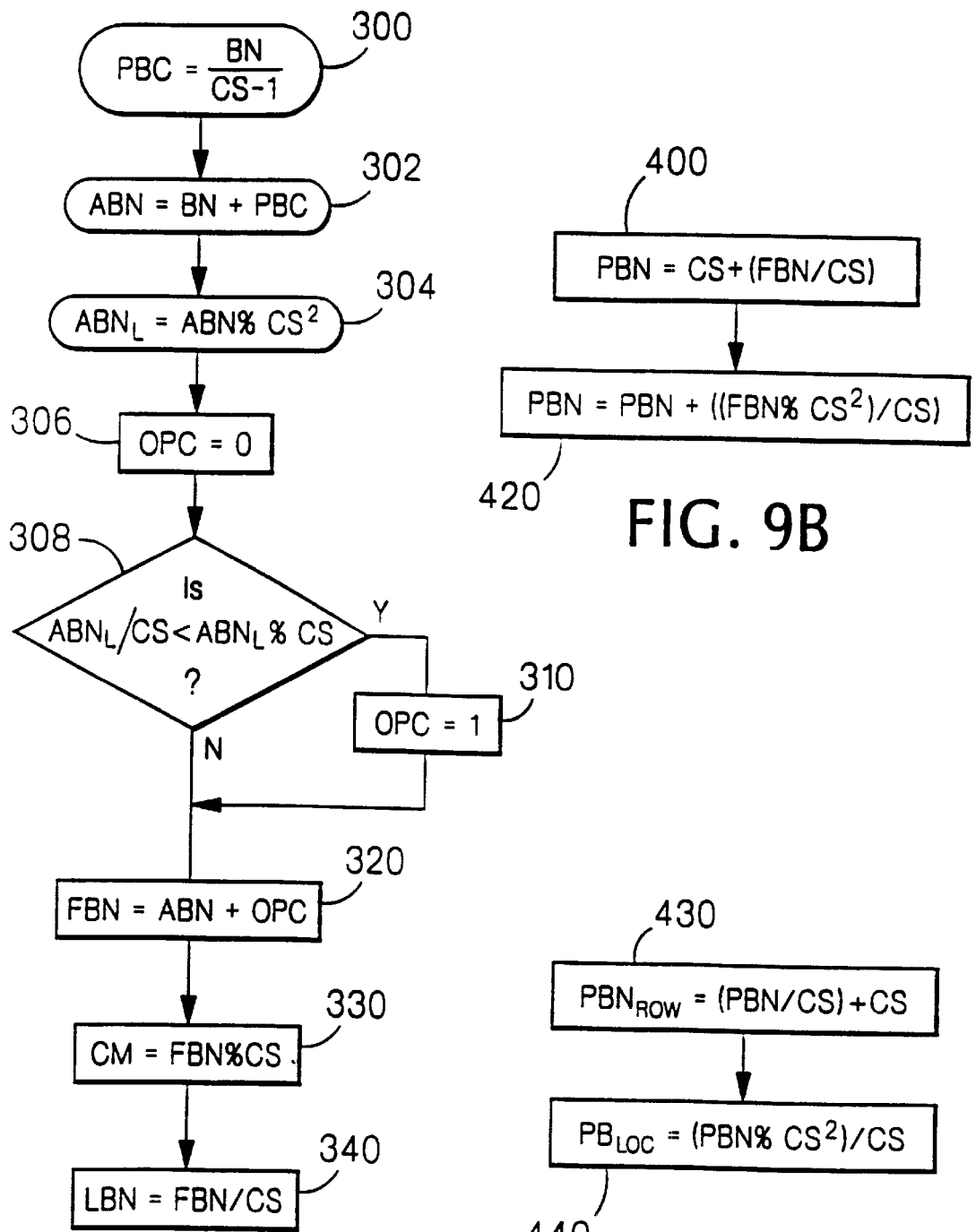
FIGS. 9A–9C are flow charts for determining data and ParityBlock locations according to the invention.

It may also be necessary to locate the DataBlocks associated with a parity block. Referring to FIG. 9C, this is determined by finding the row in which the parity block number (PBN) is to be found. The row is determined by taking the integer value of the division of the parity block number and the number of clusters and multiplying that value times the number of clusters. This is indicated at 430. The parity block location is equal to the parity block number modulo the number of cluster members squared, that quantity divided by the number of cluster members. This is indicated at 440. The following subroutine (written in C) is then employed to determine the blocks associated with the parity blocks:

for (i=0; i<CS; i++)

if (PBN$_{row}$+i!=PBN)
FBN=PBN$_{row}$+i

If a cluster processor system member fails, the reading controller for the data object implements the preceding steps to recover a missing DataBlock. The output of this operation yields the missing (failed) DataBlock.

When cluster volumes are employed, as noted above, the cluster volume master controls access to each block of the cluster volume. The computer system 10 provides a protocol to determine the cluster volume master for each volume. Each cluster volume, in the illustrated and preferred embodiment, is controlled by a different processor system member (to the extent possible) to distribute the write load across all of the cluster members. When a cluster volume master detects that a cluster processor system member has failed, it instructs the remaining cluster members to advance the cluster volume incarnation (in the HomeBlock) and to clear the cluster volume "dirty bit" in the cluster volume state. The next write operation to the cluster volume will cause the dirty bit to be set, indicating that the failed cluster member must execute a rebuilding process before it can rejoin the cluster volume. If the implemented cluster protocol prevents a write to the cluster volume while a cluster member is in a failed state, the failed member may not need to rebuild.

The cluster volume does not have to be write locked during the rebuilding operation. Write operations to already rebuilt DataBlocks simply update the DataBlock. Write operations to DataBlocks not yet rebuilt can simply be ignored and they will be reconstructed at a later time. Special care however is required when handling a write operation for the current DataBlock being reconstructed. In this case, reconstruction should be completed and the write operation should be executed after, and only after, the reconstructed data is written.

On the other hand, when the system operates upon data objects, the system can continue to operate, modifying data objects as necessary. When the failed member has been restored, it executes a rebuilding process only for the data objects which have been changed. The remaining objects are not affected. In this way, even during a failure, writing can continue to be implemented and the failure becomes transparent to the user or consumer. Importantly, also, since the rebuilding occurs object by object, it can be done at a more leisurely pace since not all of a cluster volume will be adversely affected by writing any of file within the volume.

Once a cluster processor system member has failed, the failure of any other cluster processor system member will cause the cluster volume to become unreadable in this illustrated embodiment. Only after the failed cluster member has been reconstructed, therefore, can another failure be handled for this embodiment of the invention. However, as noted above, in other embodiments of the invention, two or even more failures could be handled, however, more complex, and hence more lengthy reconstruction and encryption processes would need to be employed.

When expansion of a cluster is required, for example when cluster volumes become full or when the capacity of the cluster needs to be increased, the method and apparatus of the invention provide a process for increasing the storage capacity "on line". For example, to add storage to a cluster, disk drives are added to each cluster member (that is, each processor system 12) and a new cluster volume or new data objects can be created. This is a simple operation and the existing cluster volumes or data objects remain fault tolerant during the upgrade. Cluster members may have to be rebooted however in order to "see" (that is, recognize) the new disk drives.

However, the method and apparatus of the invention can further provide for the addition of a new cluster processor system (and its associated storage) during operation. This is a much more complex operation and can proceed as follows.

Figure 10:
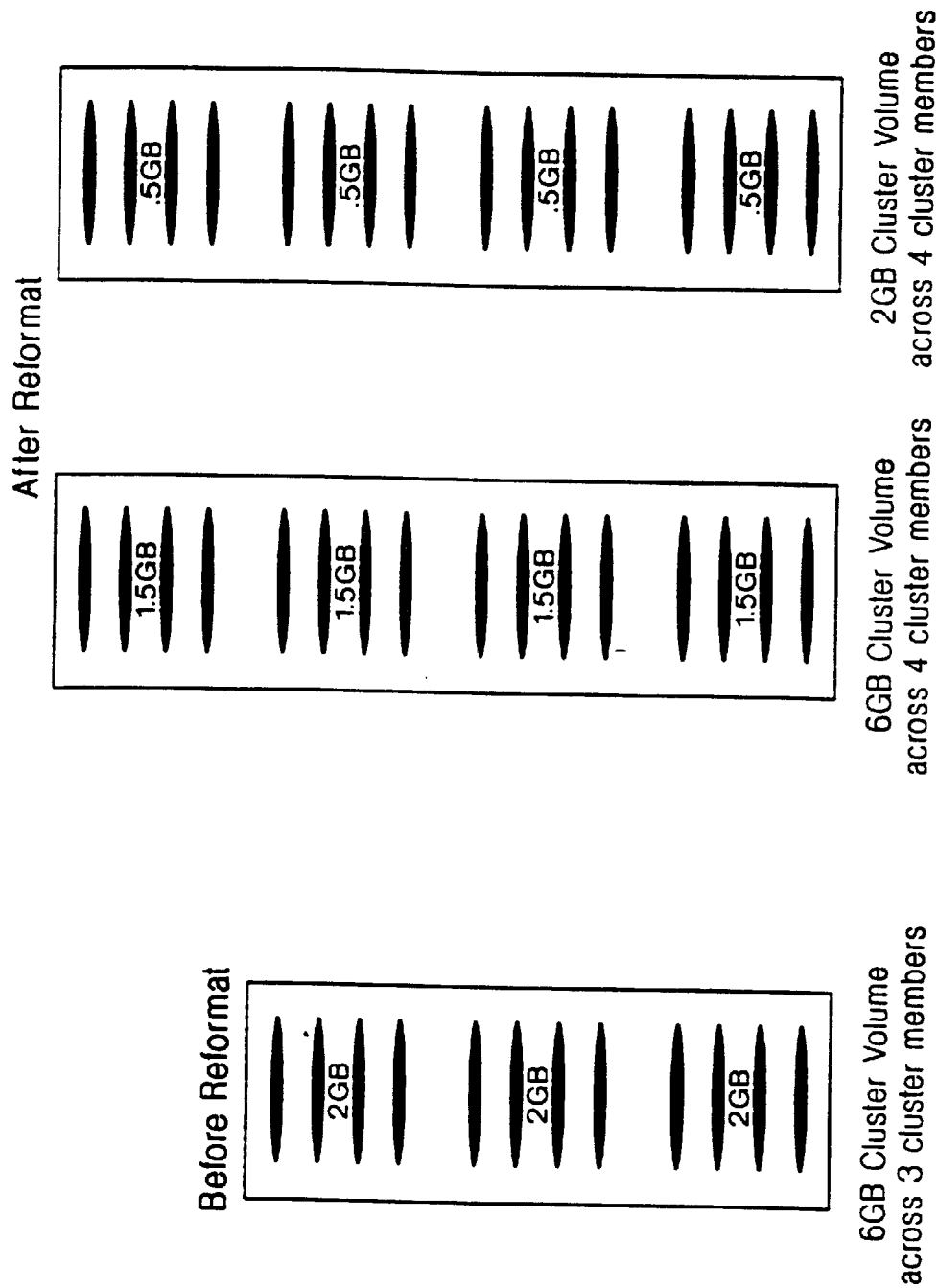
FIG. 10 illustrates a cluster volume both before and after reformatting in accordance with the invention.

The new cluster processor system member is inserted into the cluster by networking the new cluster member to each of the original cluster processor system members 12 as illustrated in FIG. 1. Each cluster volume is then "write locked" so that writing to any portion of the volume is not allowed. Each cluster volume is reformatted by initiating a change in the current cluster volume format to a new format. This operation is in essence a translation from an n member cluster volume to an n+1 member cluster volume. Each DataBlock is read and rewritten, new ParityBlocks are generated, and the progress is check-pointed in case a system failure occurs during the reformatting operation. The size of any one cluster volume is not increased by this operation; rather, each local cluster volume size is decreased and the residual disk space from the operation can be configured into yet additional cluster volume(s). Finally, as cluster volume reformatting is completed, the "write lock" is removed from the cluster volume. Referring to FIG. 10 in a typical system, the various sizes of the cluster volume within each of the cluster processor system members is illustrated both before and after reformatting.

When a new cluster member is added to a system wherein the format of the stored data is in data objects, the existing data objects need to be refragmented from n named fragment files to n+1 named fragment files. This operation can occur as a background activity allowing access to the original data object until the new named fragment files have been created. Once the new fragment files exist the old fragment files can be deleted. This process takes place, therefore, at "leisure" and at no time is the named fragment unavailable for use.

Figure 11:
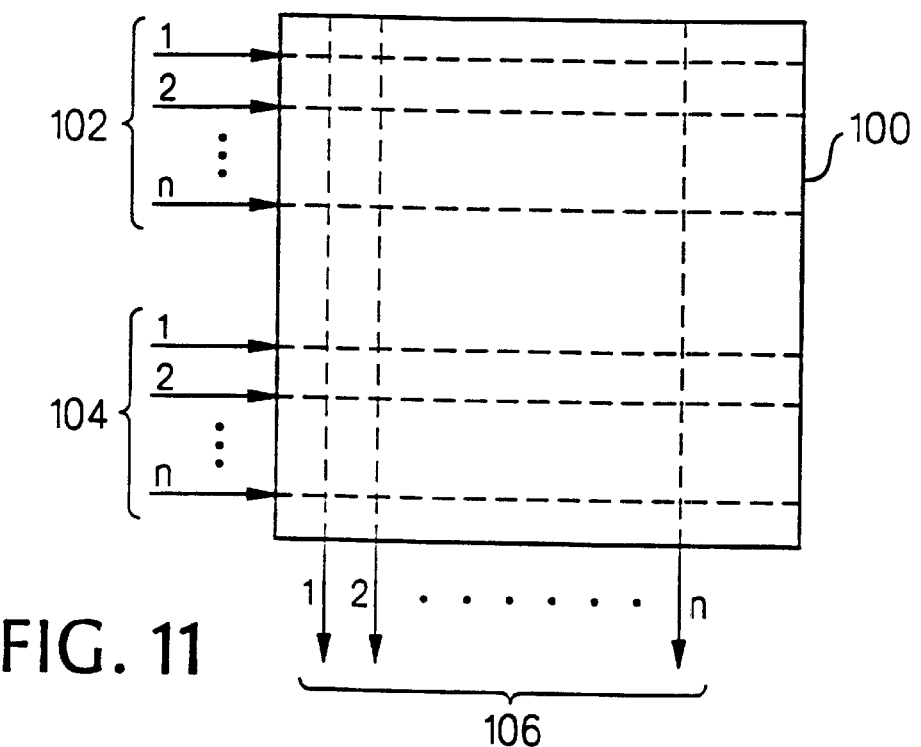
FIG. 11 illustrates a 2n×n switch.
Figure 12:
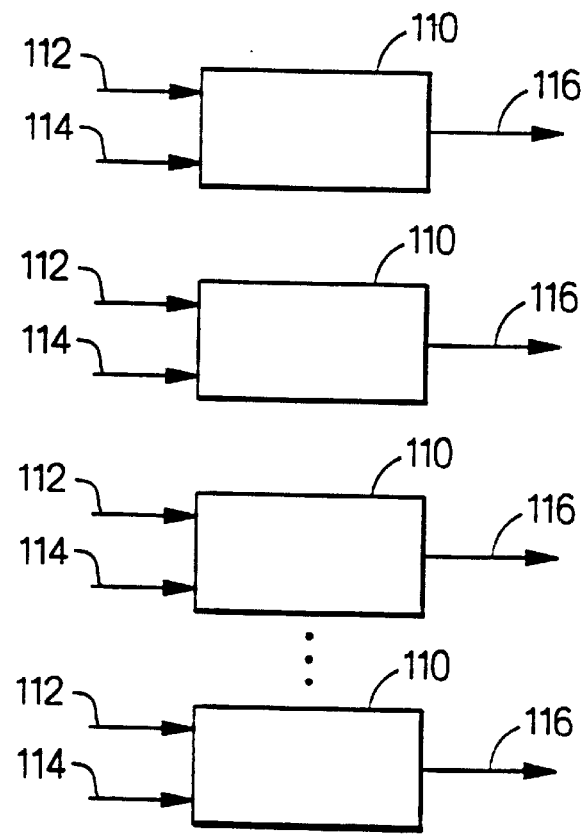
FIG. 12 illustrates n 2×1 switches in a circuit arrangement.
Figure 13:
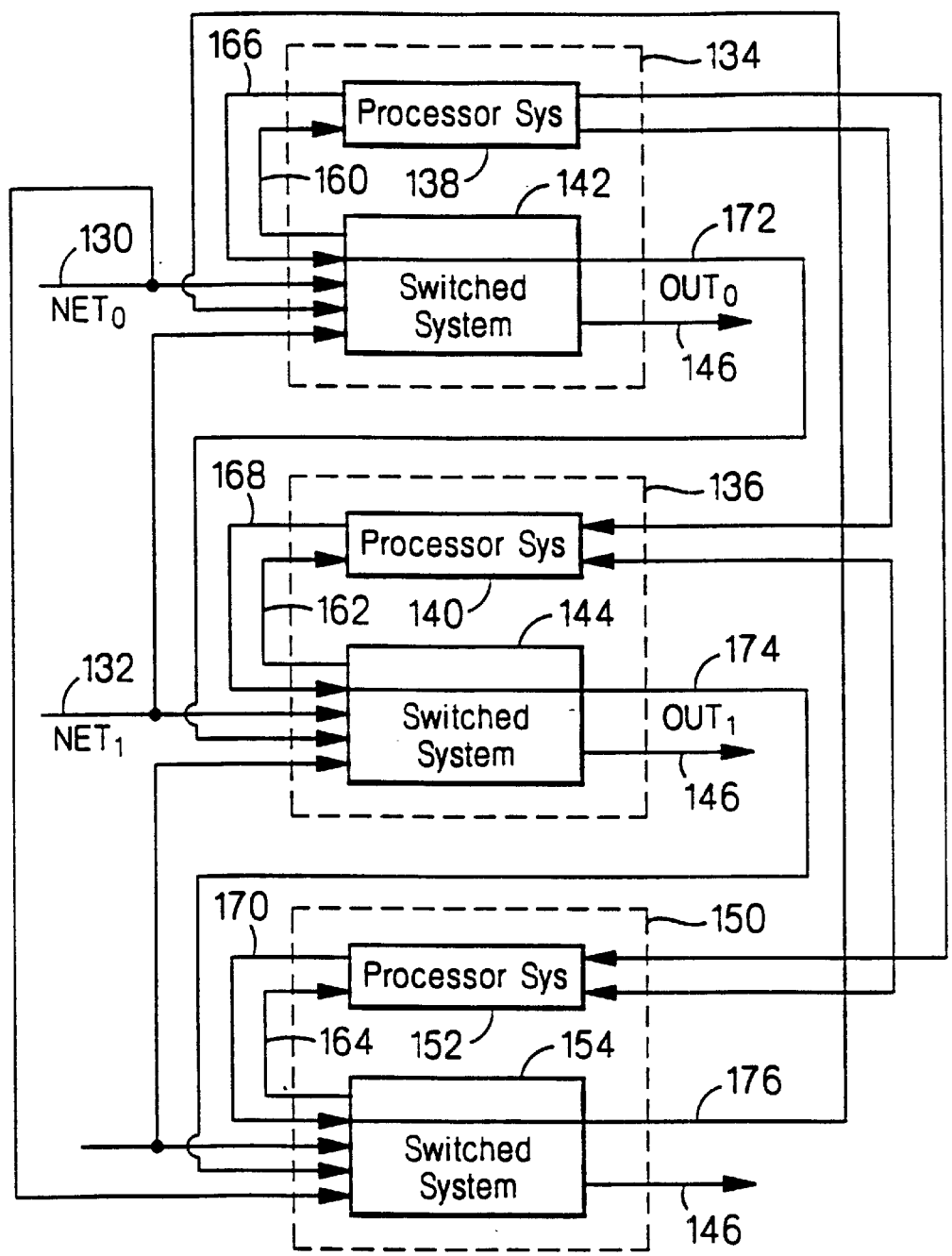
FIG. 13 illustrates a 2n×n system in accordance with the invention.

Referring now to FIGS. 11–13, there is illustrated a switching system useful in conjunction with the structure of FIG. 1, and in which a fault tolerant operation provides resiliency and robustness, as well as relatively low cost for the described system.

In a most general sense, in a video insertion system, to which the invention is particularly applicable, it is desirable to have a 2n×n cross-bar system wherein any one of 2n inputs can be placed on any of n outputs. Such a cross-bar system 100, referring to FIG. 11, might have, for example, n (interruptible) network feeds 102 and n advertising or other interrupting feeds 104 which are to be used to selectively replace the network feeds. Each of the n output selections 106 represents one of the network feeds which is switchably replaced, from time to time by one of the interrupting feeds 104. The n outputs connect to output channels for transmission over, for example, a cable network.

A simpler approach, though less flexible and hence to some extent less desirable, is illustrated in FIG. 12 wherein the 2n×n switch 108 is replaced by n two by one switches 110. In this configuration, a network input 112 is provided to each 2×1 switch 110 and an interrupting or other input 114 is also provided to each 2×1 switch 110. This system works well provided that none of the interrupting feeds is lost. (The interrupting feeds over lines 114 are typically generated by a processor system 12 and it is implicitly assumed that the network feeds are reliable and always present.) If an interrupting feed is lost, by failure of a processor system 12, then the output over lines 116 will be incorrect since there is no provision for an alternate source of the interrupting feed. In summary then, in a typical system, the network feeds over lines 112 are considered reliable and available at all times. Thus, it is only the interrupting feed over lines 114 which may fail. The interrupting feeds are typically provided by, for example, a processor system 12, and thus if the processor system 12 fails, there is no flexibility or robustness in the switches 110, as configured in FIG. 12, (or even the crossbar switch provided in FIG. 11, since the failed source cannot be replaced) to recover.

In accordance with the invention, however, a "spare" switched system is provided which can be used to replace a failed interrupting feed in the FIG. 12 embodiment, in a robust and flexible manner. Thus, referring to FIG. 13, the invention provides a method and apparatus for compensating for a failed insertion feed from a system processor by providing a complete spare system. The spare system interconnects with the active systems in a ring structure, to create a robust and fault-tolerant signal, for example video, delivery system. FIG. 13 illustrates a limited video delivery system in which there are two network feeds and two interrupting feeds generated by local processor systems. In other embodiments more network interruptible and interrupting feeds can be used and the system can be accordingly scaled. The network feeds over lines 130 and 132, designated NET0 and NET1 are input to respective video insertion and feed systems 134 and 136, respectively. Each video system has a processor system 138, 140 (these can be the same as processor systems 12 described in connection with FIG. 1) and a switched system 142, 144 which is able to place, in a controlled manner, as described below, ones of its four inputs, on its output lines.

The switched systems provide a network feed output signal on lines 146, 148, designated as OUT0 and OUT1, respectively. In the illustrated embodiment, a spare video insertion and feed system 150, which has a processor system 152 and a switched system 154 mirroring the interconnection of the processor system and switched system of video systems 134 and 136, provides a fault tolerance under the conditions described below.

The processor systems 138, 140, and 152 are interconnected by point-to-point communications and operate in a manner, with respect to each other, which is identical to that described for the larger computer system illustrated in connection with FIG. 1. Thus, any processor system 138, 140, 152 has access to the video stored by the other processor systems, and the video is stored at the processor level preferably according to a RAID-5 protocol. In the illustrated embodiment, the video objects are stored in a processor's local disk array also in accordance with a RAID-5 protocol. Each processor system receives an output feed (typically a network feed) from its associated switched system over lines 160, 162, and 164 and provides n interrupting output in response to the input feed, for example an advertisement, to its associated switched system over lines 166, 168, and 170. The signals carried over lines 160, 162, 164, 166, 168 and 170 are video signals as will be described in more detail below.

The video systems 134, 136 and 150 are interconnected in a ring structure through their switched systems. Thus, each switched system provides an output, labelled 172, 174, 176, which becomes an input to a neighboring video system in the ring configuration; and the network input line of video systems 134 and 136 is connected as another input to that other neighboring switched system on the ring which, as described above, received an input signal from its other neighboring system. Thus, the NET1 input is provided to both switched system 144 and switched system 142 while the NET0 input is provided to switched system 142 and switched system 154. Outputs 173, 174, 176 are connected respectively as inputs to systems 144, 154, and 142. Each processor system also provides, either from the processor itself or through an on-board controller 12a, typically controlled by the processor CPU, two switch control signals as described in more detail below.

Figure 14:
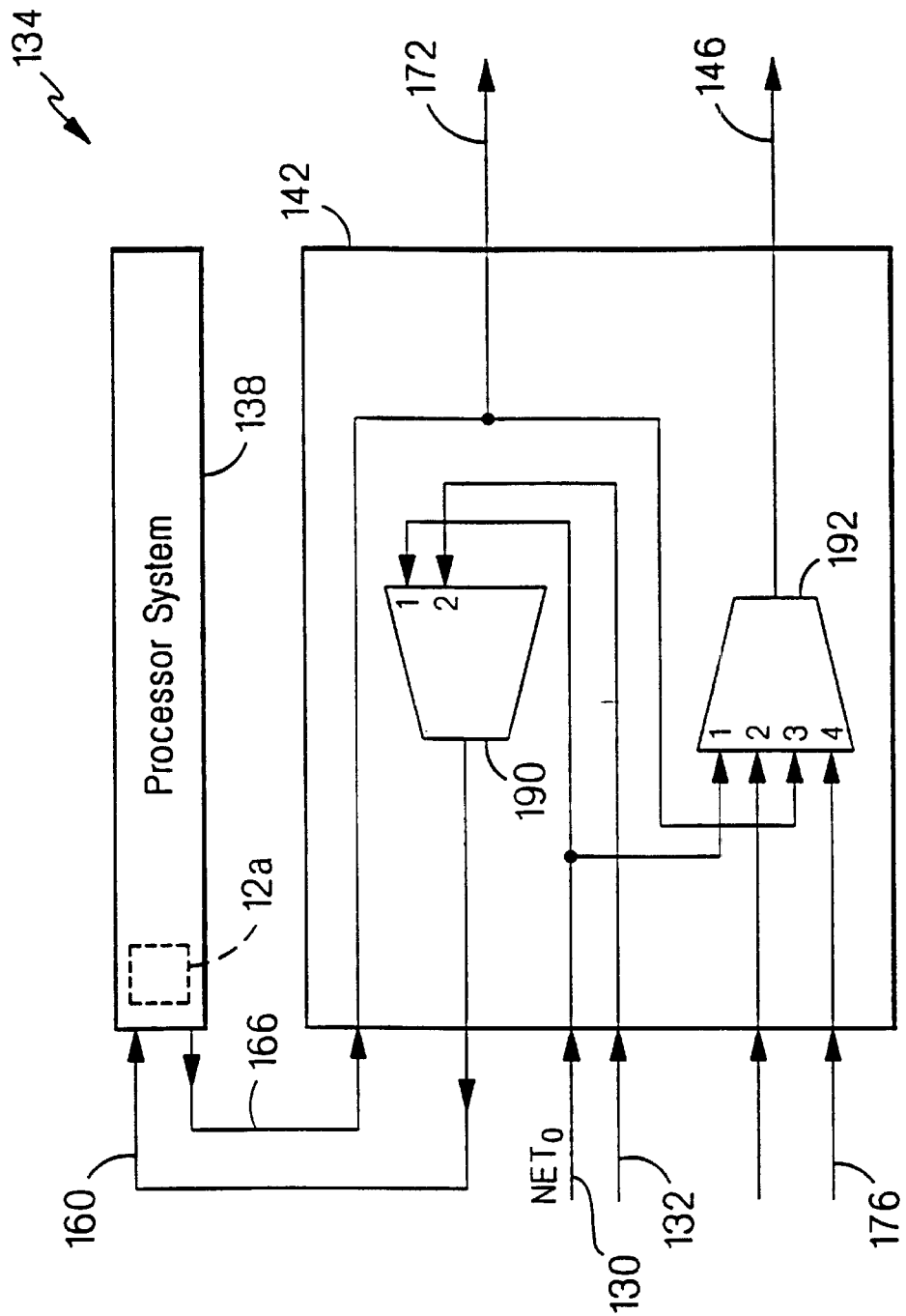
FIG. 14 is a more detailed block diagram of the switched system of FIG. 13.

Referring now to FIG. 14, there is illustrated a preferred embodiment of the video system which allows, referring to the orientation of FIG. 13, the video systems to switch in a downward round robin direction (meaning that spare video system 150 can replace the operation of video system 134 should video system 134 or video system 136 fail). Thus, as noted above, should video system 134 fail due to a processor failure (it is assumed that the switched system will not fail), the spare video system 150 replaces it and provides the correct interrupting feed to the switched system 142. Should the video system 136 fail due to a processor system failure, in a chain reaction, video system 134 will act to provide the correct interrupting feed to switched system 144 and video system 150 will thereafter operate to provide the correct interrupting feed to the switched system 142 of video system 134. This "downward" movement can be extended to a larger operating system having, for example, nine network-feeds in which case there would be the nine network video systems like circuitry 134 plus a spare video system corresponding to system 150. In other embodiments, the ring can be reconfigured to move upward or as will be hereinafter described, the switched systems can be structured so that the motion of the ring can be directed in either the upward or downward direction as viewed in FIG. 13. In this latter configuration, the interconnecting structure is more complex as will be described hereinafter.

Referring now to FIG. 14, in the illustrated embodiment, each switched system of FIG. 13 has two multi-input single output controlled switch elements 190, 192. In FIG. 14, the reference numbers correspond to the reference numbers of FIG. 13 and, in particular, the illustrated video system 134.

In normal operation, the network feed over line 130 is directed to the default or number 1 position of each of switches 190 and 192. Thus, the signal on line 130 is fed through switch 192 and is output over line 146. Simultaneously that signal is also fed through switch 190 and is output over line 160 to the processor system 138. The processor system, analyzes the input signal and provides, over line 166, at the correct time, an insert which interrupts the signal over line 130 and replaces it. This is effected by switch element 192 which changes the signal over line 146 from that connected at its number 1 position to that connected at its number 3 position. (The controller (and control lines) for switching the outputs of switches 190 and 192 have been omitted for clarity of presentation. However, each processor has two (or three) control lines for controlling the switching functions of its associated switch and at least one neighboring switch, depending upon whether the ring will fail up, fail down, or optionally fail in either direction. The processors are further, preferably, interconnected through a further communications line, such as an Ethernet bus, so that each processor is aware of the status, and actions, taken by each other processor. This allows an orderly compensation for a failed processor as described herein.) When the insert (interrupting) video over line 166 ends, the switch element 192 returns to its "default" number 1 position. Thus, in normal operation, switch 192, under the control of a controller, switches back and forth as processor system 138 generates the correct interrupting video in accordance with the processor interconnections illustrated in FIG. 13 (as an example of a simpler version of the more complex system illustrated in FIG. 1).

If the processor 140, referring now to FIG. 13, of video system 136 were to fail, the first step of the fault-tolerant system would provide that the video system of 134 would be modified so that it generates the necessary insert video signals for switched system 144 and provides those insert signals to switched system 144 over line 172. Accordingly, in this failure mode of operation, referring now also to FIG. 14, the network feed for video system 136, that is NET1 over line 132, connects to video system 134, is switched by switch element 190 of video system 134 and is placed on the output of switch element 190, that is on line 160. The processor system 138 in response to this new video generates an insert video over line 166 which is also available over line 172. That insert video signal is thus provided to the switched system 144 and its switch, which corresponds to switch 192 of switched system 142, then connects the input on its corresponding line input 4 to line 146, and outputs it over line 146 as "OUT1".

In this replacement process, however, video system 134 has lost use of its processor system 138. It thus turns to the spare video system 150 and its processor system 152 which, in combination with switched system 154 provides the appropriate insert video over line 176 (along with the correct insert control signals). Switch 192, thus, at the correct time, switches to place the insert video available over line 176 at its output, over line 146, to become OUT0. After the insert ends, switch 192 returns to its default value to place NET0, its network input, at switch position 1, as its output. In this manner, the video systems 134, 136, and 150 "cover" redundantly for each other so that a failure of one processor system will not adversely affect operation of the delivery system.

This ringed redundancy operates not only because the switched systems 142, 144, 154 are interconnected in a ring structure, but also because the processor systems themselves are interconnected and operate in a redundant fashion in accordance with the embodiment of FIG. 1. Thus, each processor system is capable of fully acquiring the necessary insert video objects stored redundantly in the collective system memory, for any of the network feeds.

The embodiment illustrated in FIGS. 13 and 14 fails in an "up direction". By simply modifying the "neighboring connections" so that, for example, video system 136 provides its network input not to video system 134 but to spare video system 150 and accordingly provides its output over line 174 not to spare video system 150 but to video system 134, the system would fail in the reverse direction.

In a second particular embodiment of the video distribution system, there is provided a more complex video switched system which is capable of shifting "in either direction" in response to a failed system. By this is meant that the ring connection, depending upon the proximity of the failure to the spare, will fail either up or down to reduce the time delay for correcting the failed situation. It will be seen, however, referring to FIGS. 13 and 14, that it is not necessary to use this system, but that single direction failure system will work substantially as well in most failure situations.

Figure 15:
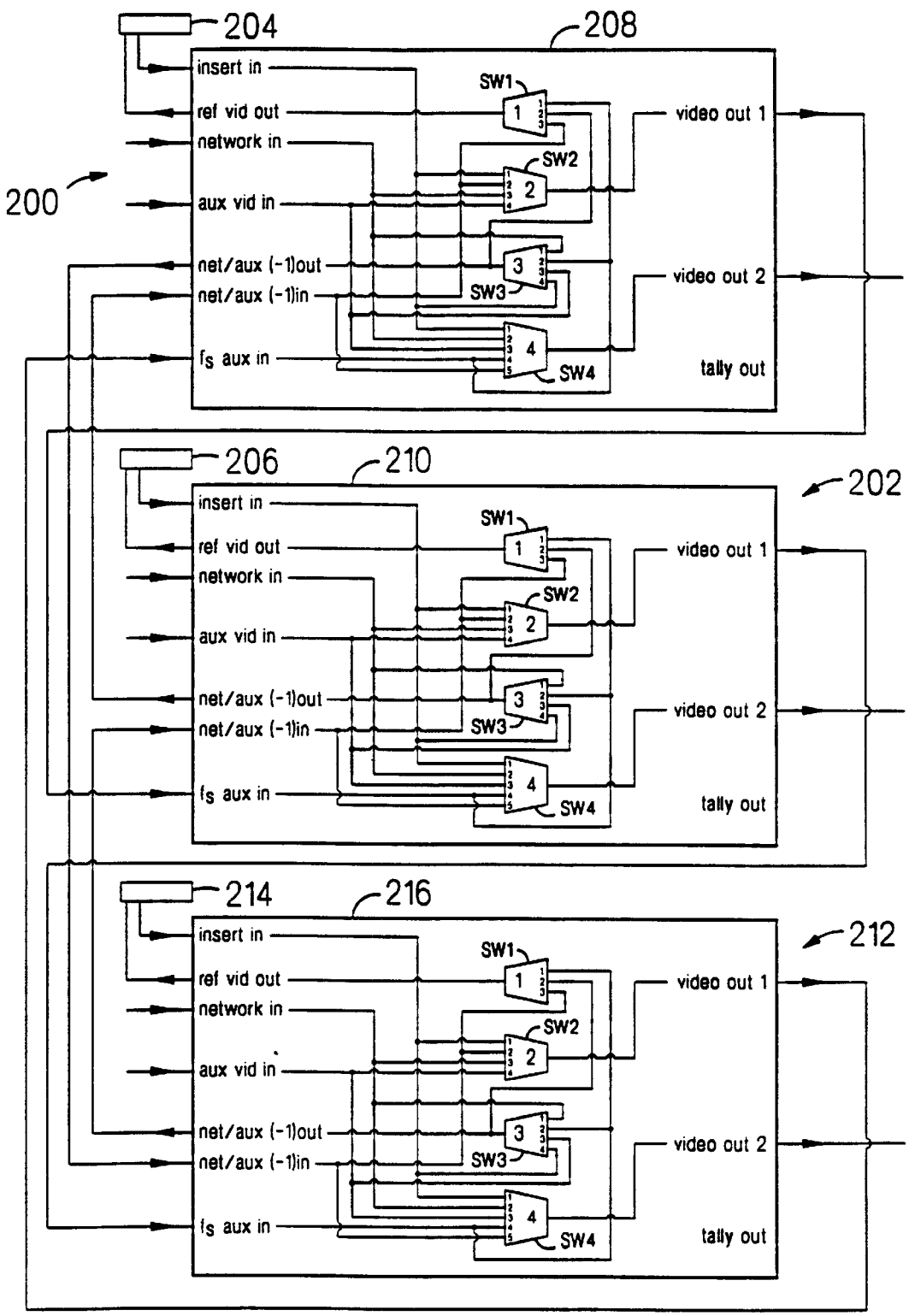
FIG. 15 illustrates a video system in a ring configuration accordance with an alternate embodiment of the invention.
Figure 16:
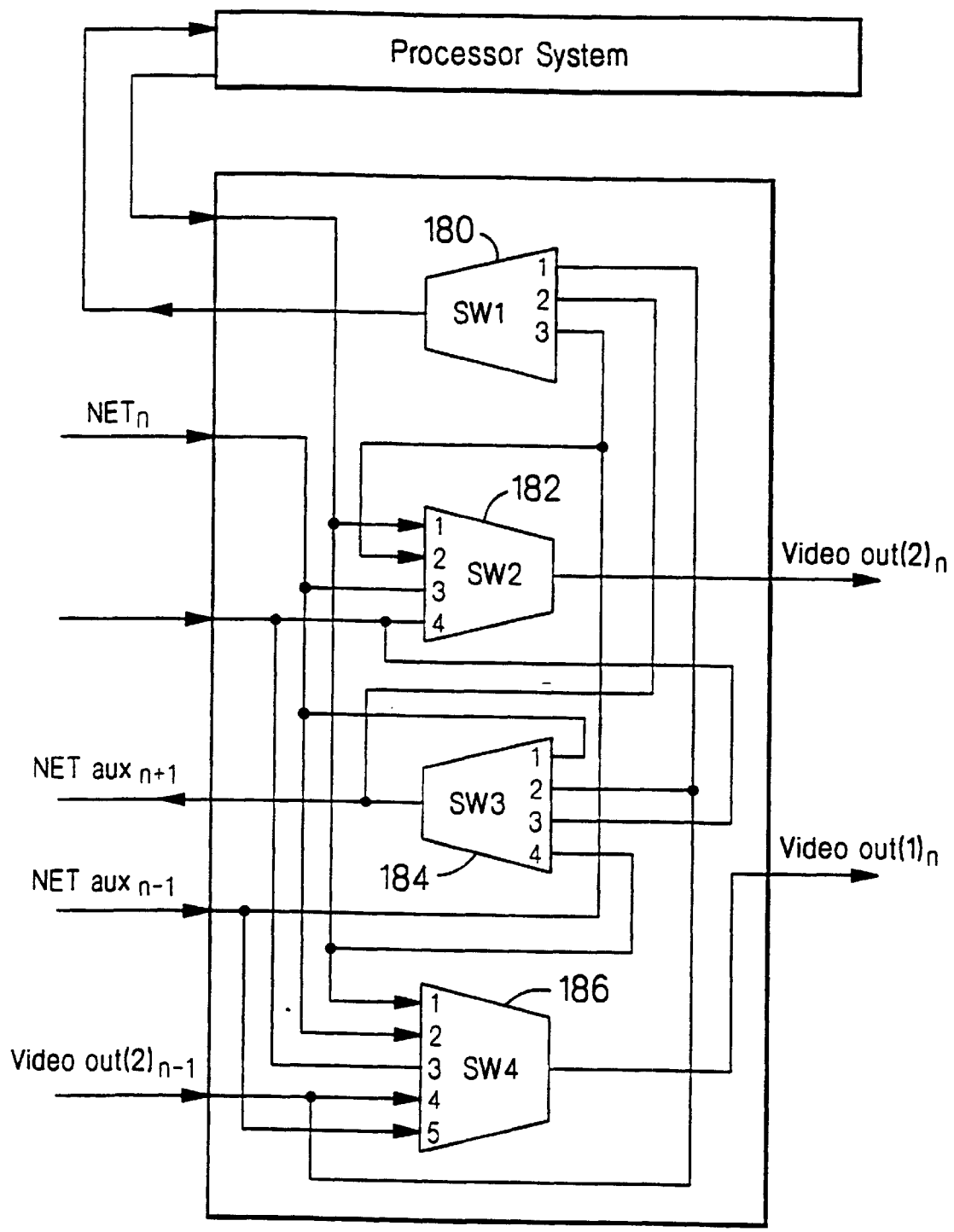
FIG. 16 illustrates, in more detail, the switched system of FIG. 15.

Accordingly, referring to FIGS. 15 and 16, there is illustrated a 3 element ringed system which can fail in either direction. This system operates in a manner corresponding to that of the video delivery system illustrated in connection with FIGS. 13 and 14, and accordingly, its detailed operation need not be described. The ringed system has two video systems 200 and 202, each of which has a video processor 204, 206, and a switched system 208, 210 respectively. In addition there is a spare video system 212 having a video processor 214 and a switched system 216. (The point to point, two way, interconnecting channels between the processors 204, 206, 214, and the processor controllers, have not been shown for purposes of more clearly illustrating the other connections in the figure.) In operation, if a failure occurs, the failed system can be replaced by a shift upward by one closest "lower" neighbor or a shift downward by its other closest neighbor. The direction of the shift will depend primarily upon where the failure occurred in the ring. Accordingly, the fewer shifts needed to achieve full operation of the video distribution system will determine the direction of shift along the ring.

Independent of the direction of the shift, and referring to FIG. 15, the processor system 214 of the spare video processor 212 will, in this illustrated embodiment, replace the processor system which has failed. The switch elements of the switched systems for the spare system and the failed system will reconfigure the switches to provide the network input for the failed system to the spare system, which will provide that network input to its processor system. The video insert output of the processor system will then be routed through the spare switched system to the switch system corresponding to the failed processor for delivery, at the correct time, to its output. When more than two input network feeds are used, a larger element ringed system can be employed, and, as with the embodiment of FIGS. 13, and 14, the video systems will chain with a first nearest neighbor replacing the failed processor and a next second nearest neighbor then acting to replace the processor of the first nearest neighbor, etc., until the spare video system is used.

Referring to FIG. 16, a typical switched system has four multi-input switches 180, 182, 184, and 186 connected as illustrated in FIG. 16, in one particular embodiment of the invention, in order to enable the switching described hereinabove to take place. Referring to FIG. 17, there is provided a truth table indicating, for each switch of FIG. 16, its status depending upon whether the switch is operating in a "normal" mode, in a failed-up mode, or a failed-down mode. The number within the matrix identifies, for a switch of FIG. 16, which input to direct to the output. (An "x" indicates a "don't care" condition.) For switch 4 (reference number 186) the selected input depends upon whether the switch is expected to place the interruptible input ("NO INSERT") or the interrupting input ("INSERT") at its output port. As with the circuitry of FIGS. 13 and 14, the processor controller and the control lines to each of the switches 180, 182, 184, and 186 are not detailed in order to be able to understand better the operation of the system.

Additions, subtractions, and other modifications of the preferred embodiments of the invention will be apparent to those practiced in the art and are within the scope of following claims.

What is claimed is:

1. A method of retrieving a video object from a clustered video system that has a plurality of clustered members, the method comprising:
    reading fragment files from the clustered members of the clustered system, with each clustered member maintaining a file system, and with the fragment files having a header block that allows the fragment files to be self-describing so that a cluster member can maintain its file system private and export access to the video object.

2. The method of claim 1 wherein each cluster member reads, writes, or deletes files from its local file system without disrupting other members of the cluster.

3. The method of claim 1 wherein the fragment files are distributed across at least some of the cluster members.

4. The method of claim 3 wherein each cluster member comprises:
    a processor system including a CPU; and
    local storage to store portions of the plurality of fragment files.

5. The method of claim 1 wherein the fragment files further comprise:
    data blocks that store data that can render the video object on an output device.

6. The method of claim 1 wherein the fragment files further comprise
    parity blocks that are calculated from data blocks.

7. The method of claim 1 wherein the fragment header comprises
    a fragment count field that indicates the fragment count, a stripe size field that indicates a data object. stripe size, and a data object name field that indicates a data object name.

8. The method of claim 1 wherein each cluster member includes local storage for fragment files, and each cluster member reads, writes or deletes files from the cluster member local file system without disrupting other members of the cluster.

9. The method of claim 1 wherein the cluster system members execute a video application to manage access to the video object.

10. The method of claim 1 further comprising:
    storing the video object on the clustered system; and wherein storing further comprises:
        defragmenting the video object into the plurality of fragment files; and
        storing the file fragments across the video system.

11. A clustered video system for storing a video object, the clustered video system comprising:
    a plurality of cluster members, each of the cluster members comprising:
        local storage to store portions of the video objects as fragment files, the fragment files containing a header block and data blocks, the header block allowing the fragment files to be self-describing so that the cluster member can keep a private file system and export access only to the video object; and
        a computer processor unit that executes a video application program to manage the access to the video object.

12. The clustered video system of claim 11 wherein each cluster member reads, writes or delete files from its local file system without disrupting the local file system of the other video cluster members.

13. The clustered video system of claim 11 wherein the fragment files are distributed across at least some of the cluster members.

14. The clustered video system of claim 11 wherein the cluster members are interconnected through a network.

15. The clustered video system of claim 11 wherein the fragment files further comprise parity blocks that are calculated from the data blocks.

16. The clustered video system of claim 11 wherein Huffman coding is used as a redundancy method to detect failure of a processor.

17. The clustered video system of claim 11 wherein the fragment header comprises:

a field that indicates the fragment count, a field that indicates video object stripe size, and a field that indicates the video object name.

18. The cluster video system of claim 11 wherein file system for the local storage of each cluster member is maintained for the named fragment files by the central processing unit of the cluster member.

19. The clustered video system of claim 11 wherein video object is stored as the plurality of fragment files across at least some of the members of the video cluster system.

* * * * *

UNITED STATES PATENT AND TRADEMARK OFFICE
CERTIFICATE OF CORRECTION

PATENT NO. : 6,557,114 B2
DATED : April 29, 2003
INVENTOR(S) : Bruce E. Mann et al.

It is certified that error appears in the above-identified patent and that said Letters Patent is hereby corrected as shown below:

Tiltle page,
Item [56], References Cited, OTHER PUBLICATIONS, "A.J. Nichols" reference, delete "Injuction", insert -- Injunction --; "Winfried Mularski" reference, delete "Multicluster", insert -- MULTICLUSTER --; "Alexander Thomasian" reference, insert quotation mark before "Performance" and insert quotation mark after "Operation"; "Mike W. Perry" reference, delete "$\leq$" after html, insert -- > --; "Seachange" 7th reference, insert a space between "Seachange" and "v";

Column 1,
Line 6, insert -- (pending) -- after 1999;
Line 8, insert parentheses before "now" and after "5,996,089";
Line 10, insert parentheses before "now" and after "5,862,312" (per amendment dated 9/18/01);

Column 18,
Line 2, insert a colon after "comprise (comprise:);
Line 2, insert a colon after "comprises (comprises:);
Line 4, delete the period after "object".

Signed and Sealed this

Twenty-fourth Day of May, 2005

JON W. DUDAS
*Director of the United States Patent and Trademark Office*